United States Patent
Edwards

(10) Patent No.: US 9,553,761 B2
(45) Date of Patent: *Jan. 24, 2017

(54) DYNAMIC SERVER TO SERVER CONFIGURATION AND INITIALIZATION

(71) Applicant: SAS Institute Inc., Cary, NC (US)

(72) Inventor: Clint Edwards, Fuquay-Varina, NC (US)

(73) Assignee: SAS INSTITUTE INC., Cary, NC (US)

( * ) Notice: Subject to any disclaimer, the term of this patent is extended or adjusted under 35 U.S.C. 154(b) by 173 days.

This patent is subject to a terminal disclaimer.

(21) Appl. No.: 14/597,031

(22) Filed: Jan. 14, 2015

(65) Prior Publication Data

US 2015/0200807 A1 Jul. 16, 2015

Related U.S. Application Data

(63) Continuation of application No. 14/597,007, filed on Jan. 14, 2015, now Pat. No. 9,325,576.

(60) Provisional application No. 61/927,725, filed on Jan. 15, 2014.

(51) Int. Cl.
*H04L 12/24* (2006.01)
*H04L 29/08* (2006.01)

(52) U.S. Cl.
CPC ....... *H04L 41/0806* (2013.01); *H04L 41/0813* (2013.01); *H04L 67/1097* (2013.01); *H04L 67/16* (2013.01)

(58) Field of Classification Search
CPC combination set(s) only.
See application file for complete search history.

(56) References Cited

U.S. PATENT DOCUMENTS

| | | | |
|---|---|---|---|
| 8,429,242 B1* | 4/2013 | Todd | H04N 21/232 709/217 |
| 2002/0056011 A1* | 5/2002 | Nardone | G06F 17/30581 709/248 |
| 2003/0078930 A1* | 4/2003 | Surcouf | G11B 27/005 |
| 2004/0103220 A1* | 5/2004 | Bostick | H04L 12/24 709/253 |
| 2005/0242178 A1* | 11/2005 | Minowa | G06Q 30/0225 235/383 |

(Continued)

OTHER PUBLICATIONS

Office Action received for U.S. Appl. No. 14/597,007, mailed May 6, 2015, 13 pages.

*Primary Examiner* — Saket K Daftuar

(57) ABSTRACT

An apparatus includes a discovery component to identify a first application routine within a storage for execution, to identify execution of a remote application routine within a node device as a first requisite for execution of the first application routine from a first application requisites data, and to provide indications of storage of the first application routine and the first requisite to a control master; a start component to restart an earlier started execution of the first application routine in response to receipt of an indication that execution of the remote application routine within the node device has been restarted in accordance with a catalog received from the control master, the catalog including indications of the first and remote application routines and an indication of the first requisite; and a status component to provide an indication to the control master of the restart of execution of the first application routine.

31 Claims, 15 Drawing Sheets

(56) References Cited

U.S. PATENT DOCUMENTS

| | | | |
|---|---|---|---|
| 2006/0271431 A1* | 11/2006 | Wehr | G06Q 20/20 |
| | | | 705/14.27 |
| 2012/0102062 A1* | 4/2012 | Gurnani | G06Q 30/0601 |
| | | | 707/769 |
| 2013/0128300 A1* | 5/2013 | Takamoto | G06F 9/455 |
| | | | 358/1.13 |
| 2013/0191397 A1* | 7/2013 | Avadhanam | G06F 17/3053 |
| | | | 707/748 |
| 2013/0314726 A1* | 11/2013 | Nishimura | G06F 3/1281 |
| | | | 358/1.6 |
| 2013/0317927 A1* | 11/2013 | Bush | G06Q 20/3278 |
| | | | 705/21 |
| 2014/0033191 A1* | 1/2014 | Ward | G06F 8/71 |
| | | | 717/170 |
| 2014/0045597 A1* | 2/2014 | Fernandez | G06F 11/3672 |
| | | | 463/42 |
| 2015/0089075 A1* | 3/2015 | Strigeus | G06F 17/30321 |
| | | | 709/231 |
| 2015/0106887 A1* | 4/2015 | Aslund | H04L 63/0492 |
| | | | 726/5 |

\* cited by examiner

DYNAMIC SERVER TO SERVER CONFIGURATION AND INITIALIZATION

CROSS-REFERENCE TO RELATED APPLICATIONS

This application claims the benefit of priority under 35 U.S.C. §119(e) to U.S. Provisional Application Ser. No. 61/927,725 entitled SERVICE COORDINATOR STARTER filed Jan. 15, 2014, the entirety of which is incorporated herein by reference.

This application is a continuation of and claims the benefit of priority under 35 U.S.C. §120 to U.S. patent application Ser. No. 14/597,007 entitled DYNAMIC SERVER TO SERVER CONFIGURATION AND INITIALIZATION filed Jan. 14, 2015, and issued on Apr. 26, 2016 as U.S. Pat. No. 9,325,576, the entirety of which is incorporated herein by reference.

BACKGROUND

It has become commonplace to deploy combinations of computing devices to provide various server functions accessible by a network. One or more of such computing devices may further provide multiple virtual machine (VM) environments within to simulate the presence of an ever greater quantity of computing devices. Such complex installations may be used to support the execution of multiple applications to provide a variety of server functions, and/or to improve performance and responsiveness of one or more server functions by executing multiple instances of the same application in parallel.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

A computer-program product may be tangibly embodied in a non-transitory machine-readable storage medium where the computer-program product may include instructions that may be operable to cause a processor component to perform operations including identify a first application routine stored within a storage of a first node device for execution by the first node device; identify execution of a remote application routine by a second node device as a first requisite for execution of the first application routine from a first application requisites data stored within the storage; provide indications of storage of the first application routine within the first node device for execution by the first node device and the first requisite to a control master; start execution of the first application routine in response to receipt of an indication that execution of the remote application routine by the second node device has started in accordance with a catalog received from the control master, wherein the catalog comprises indications of the first and remote application routines and an indication of the first requisite; and provide an indication to the control master of the start of execution of the first application routine.

A computer-implemented method may include identifying a first application routine stored within a storage of a first node device for execution by a first processor component of the first node device; identifying execution of a remote application routine by a second processor component of a second node device as a first requisite for execution of the first application routine from a first application requisites data stored within the storage; providing indications of storage of the first application routine within the first node device for execution by the first processor component and the first requisite to a control master; starting execution of the first application routine in response to receipt of an indication that execution of the remote application routine by the second processor component of the second node device has started in accordance with a catalog received from the control master, wherein the catalog comprises indications of the first and remote application routines and an indication of the first requisite; and providing an indication to the control master of the start of execution of the first application routine.

An apparatus may include a processor component; a storage to store a first application routine for execution by the processor component and a first application requisites data; a discovery component for execution by the processor component to identify the first application routine as stored within the storage for execution by the processor component, to identify execution of a remote application routine by another processor component of a node device as a first requisite for execution of the first application routine from the first application requisites data, and to provide indications of storage of the first application routine within the storage for execution by the processor component and the first requisite to a control master; a start component for execution by the processor component to start of execution of the first application routine in response to receipt of an indication that execution of the remote application routine by the other processor component of the node device has started in accordance with a catalog received from the control master, wherein the catalog comprises indications of the first and remote application routines and an indication of the first requisite based on the indications provided to the control master; and a status component for execution by the processor component to provide an indication to the control master of the start of execution of the first application routine.

A computer-program product may be tangibly embodied in a non-transitory machine-readable storage medium where the computer-program product may include instructions that may be operable to cause a processor component to perform operations including identify a first application routine stored within a storage of a first node device for execution by the first node device; identify execution of a remote application routine by a second node device as a first requisite for execution of the first application routine from a first application requisites data stored within the storage; provide indications of storage of the first application routine within the first node device for execution by the first node device and the first requisite to a control master; restart an earlier started execution of the first application routine by the first node in response at least to receipt of an indication that execution of the remote application routine by the second node device has been restarted in accordance with a catalog received from the control master, wherein the catalog comprises indications of the first and remote application routines and an indication of the first requisite based on the indications provided to the control master; and provide an indication to the control master of the restart of execution of the first application routine.

A computer-implemented method may include identifying a first application routine stored within a storage of a first node device for execution by a first processor component of the first node device; identifying execution of a remote application routine by a second processor component of a second node device as a first requisite for execution of the first application routine from a first application requisites data stored within the storage; providing indications of storage of the first application routine within the first node device for execution by the first processor component and the first requisite to a control master; restarting an earlier started execution of the first application routine by the first processor component in response to receipt of an indication that execution of the remote application routine by the second processor component of the second node device has been restarted in accordance with a catalog received from the control master, wherein the catalog comprises indications of the first and remote application routines and an indication of the first requisite based on the indications provided to the control master; and providing an indication to the control master of the start of execution of the first application routine.

An apparatus may include a processor component; a storage to store a first application routine for execution by the processor component and a first application requisites data; a discovery component for execution by the processor component to identify the first application routine as stored within the storage for execution by the processor component, to identify execution of a remote application routine by another processor component of a node device as a first requisite for execution of the first application routine from the first application requisites data, and to provide indications of storage of the first application routine within the storage for execution by the processor component and the first requisite to a control master; a start component for execution by the processor component to restart an earlier started execution of the first application routine in response to receipt of an indication that execution of the remote application routine by the other processor component of the node device has been restarted in accordance with a catalog received from the control master, wherein the catalog comprises indications of the first and remote application routines and an indication of the first requisite based on the indications provided to the control master; and a status component for execution by the processor component to provide an indication to the control master of the restart of execution of the first application routine.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

DETAILED DESCRIPTION

Figure 1:
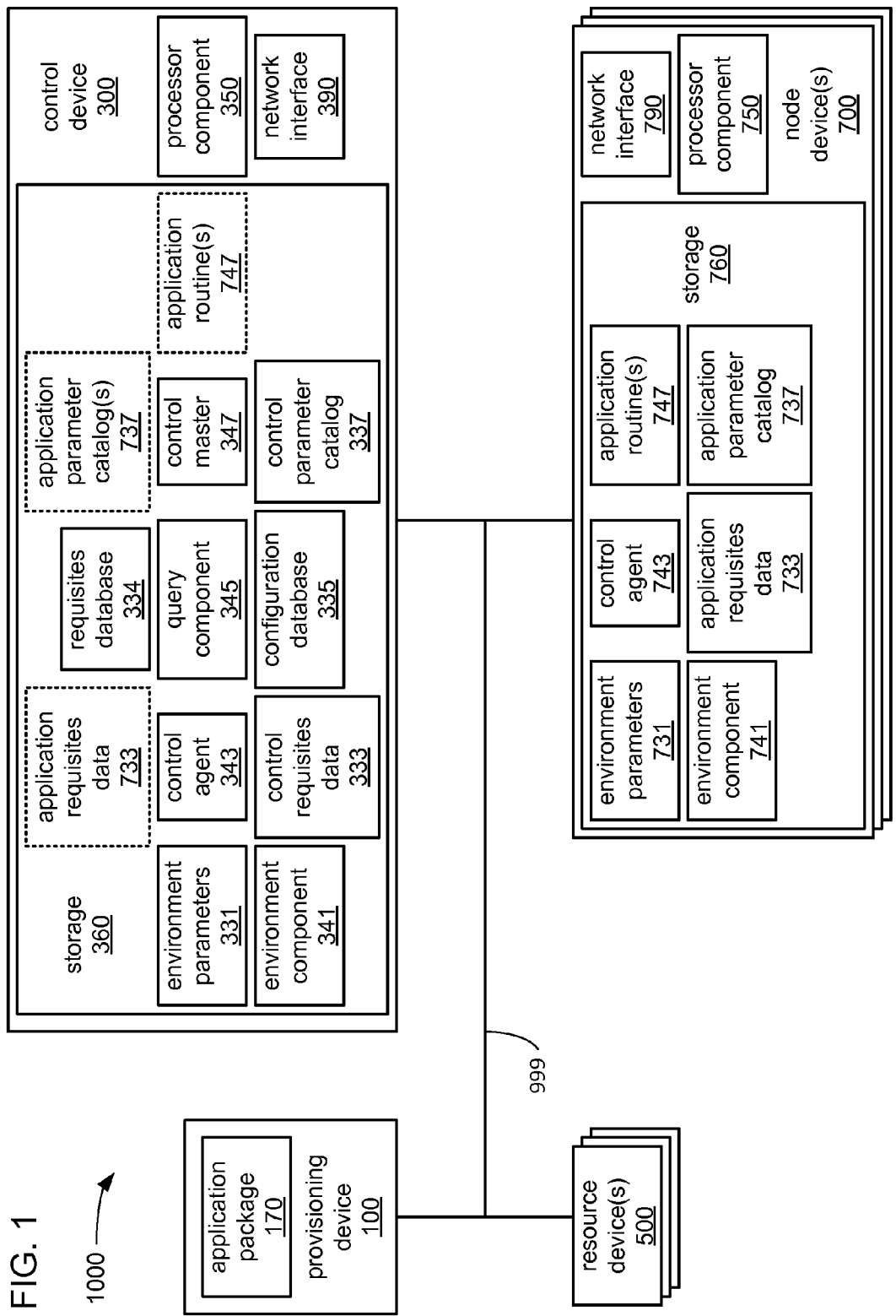
FIG. 1 illustrates an example embodiment of an analysis system.

Combinations of multiple computing devices that are to operate together to provide various server functions can be difficult to configure, initialize, update and reinitialize correctly. Although various ones of the applications that are executed in such installations may have dependencies on each other and/or on resources provided by still other devices, there may be no provision within the applications and/or resources themselves to ease the work and complexity of configuring those applications to cooperate in order to address those dependencies. Further, updates and/or upgrades to any one of the computing devices, applications and/or resources often require corresponding changes to one or more others of the computing devices, applications and/or resources such that there may be a form ripple effect that arises.

Various embodiments described herein are generally directed to dynamically configuring and initializing virtual machine environments and application routines among multiple computing devices deployed together as servers. A combination of virtual machine (VM) environment, application software and dynamic configuration software may be installed on one or more computing devices that are to be operated together. Discovery components of the configuration software may perform various tests and/or searches for various pieces of configuration information concerning aspects of the computing devices, the VM(s) to be provided within the computing devices and/or the application routines, including which computing devices are to execute which application routines. From the results of the tests and/or searches, a requisites database is generated that includes indications of requisites for the execution of various routines, including dependencies among routines and/or dependencies of each routine on various resources. A query component may communicate with one or more resource devices to obtain various pieces of configuration information indicated as requisite pieces of configuration information in the requisites database. The query component may then generate a configuration database of configuration information needed for the initialization and/or operation of VMs and/or application routines executed within the VMs. From the configuration database, a separate parameter catalog of configuration information may be generated for each of the computing devices that specifies various parameters for the operation of that computing device, one or more VMs that may be provided within that computing device, and/or one or more application routines executed within that computing device. Each of the parameter catalogs may be used by the computing device for which it is generated to control the start and/or subsequent restart of the one or more application routines executed therein.

Virtual environment routines, one or more application routines, configuration software, parameter data and specifications of requisites for each may be packaged together into a single file (e.g., a single compressed file, such as a so-called "zip" file) and/or into a single storage medium (e.g., an optical disk or a solid state storage device, such as a "thumb drive") for easier installation onto multiple computing devices deployed together as servers. The particular combination of virtual environment routines and one or more application routines may be uniquely specified for each such package based on what combination of server functions are to be performed by those computing devices onto which the package is to be installed. The need for customization of the virtual environment routines and/or the application routines, themselves, may be minimized or entirely eliminated based on a lack of need to include a configuration script tailored to the particular combination of virtual environment routines and/or application routines as a result of an ability of the configuration software to dynamically determine what routines are included in the package and to itself tailor the configuration of those routines based on what routines are so included.

Following installation of the package onto each of the computing devices, and upon powering up or resetting of those computing devices, a discovery component of the configuration software within each of the computing devices may perform various tests to determine various aspects of the hardware components of the computing devices, such as processor component, available storage and/or available network interface. The discovery component may also search for and parse one or more files or data structures associated with the virtual environment routines and/or the application routines to obtain information concerning requisites for executing each of those routines. Those requisites may include dependencies between application routines such that one application cannot be started until after another is started, and/or one application must be restarted whenever another application is restarted.

In some embodiments, each application routine on each computing device may be required to be accompanied by or otherwise include a file or other data structure specifying the requisites of that application routine. In addition to ensuring that the requisites for each application routine are set forth in a discoverable manner, the presence of each such file or data structure may also serve as an indication of what application routines are actually installed on each computing device. It is in this way that it may be discovered which application routine(s) and/or how may instances of each application routine are to be executed within each computing device. It is also in this way that the need to customize virtual environments and/or to create a customized configuration script for each possible combination of routines that may be installed on a given computing device may be eliminated. Stated differently, instead of a custom script file or other data structure having to be generated to indicate what routines are installed on a computing device, a search is conducted for files or data structures specifying execution requisites to enable an automated determination to be made as to what routines are installed on that computing device.

The results of the tests and searches performed within each computing device may be combined to form a requisites database that indicates the requisites for each VM and/or each instance of each application routine to be executed within each computing device. Among the requisites may be requisite pieces of information to be obtained from one or more resource devices, and a query component of the configuration software may engage in communications with the one or more resource devices through a network to attempt to obtain those pieces of configuration information. After obtaining at least a subset of such pieces of configuration information from the one or more resource devices, the query component may generate a configuration database of configuration information. A catalog generator may use the contents of the configuration database to generate a separate parameter catalog of configuration information for each computing device.

Among the pieces of configuration information in the configuration database that may be used in generating each catalog may be indications of dependencies among virtual environment routines and/or the application routines, as well as between one or more of those routines and one or more resource devices. Configuration information concerning such dependencies may indicate a need for an order of initialization of the various virtual environment routines and/or the application routines to ensure that, upon powering up and/or resetting one or more of the computing devices, VMs and/or application routines, one or more others of the VMs and/or application routines are started and/or restarted in an order that accommodates those dependencies.

Following the starting of the virtual environment routines and the application routines in accordance with the catalog(s), one or more of the tests and searches to obtain pieces of configuration information from which to form the requisites database, the communications with the one or more resource devices, the generation of the configuration database and the generation of the parameter catalogs may be repeated. In some embodiments, such repetition may take place at the end of a repeating interval of time. Also following the start of execution of the virtual environment routines and the application routines, the status of at least one or more of the application routines may be repeatedly checked to determine if restarting the execution of one or more of the application routines is necessary. In some embodiments, such a check may be triggered within a computing device upon the provision of a new parameter catalog to that computing device. If an application routine is determined to be nonfunctional (e.g., unresponsive or no longer being executed) such that a restart of its execution is required, then that application routine may be so restarted, and that restart may trigger the restart of one or more other application routines due to dependencies thereamong. Further, following the starting of the virtual environment routines and the application routines, one or more of the application routines may monitor aspects of their own execution for indications of a change in a requisite to their own execution that necessitates being restarted. If an application routine determines that its execution needs to be restarted, then again, the restarting of execution of that application routine may trigger the restart of one or more other application routines due to dependencies thereamong.

With general reference to notations and nomenclature used herein, portions of the detailed description that follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities.

Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example embodiment of an online services system 1000 incorporating one or more of a provisioning device 100, a control device 300, one or more resource devices 500 and/or one or more node devices 700 that may cooperate to dynamically configure aspects of VM environments and/or application routines 747 that may be executed within those VM environments. In various embodiments, the control device 300 and the one or more node devices 700 may form a server farm, grid or other combination of computing devices that may be operated together to execute more than one application routine 747 and/or multiple instances of the same application routine 747 in parallel.

The control device 300 and/or the one or more node devices 700 may be provided with a combination of software and configuration data for providing virtual machine environment(s) and/or executing the one or more application routines 747, and/or updates thereto, in an application package 170 via a network 999 from the provisioning device 100. Alternatively or additionally, the application package 170 may be conveyed from the provisioning device 100 to the control device 300 and/or the one or more node devices 700 via non-volatile removable storage media such as an optical disc or a solid state storage device.

Each of the one or more application routines 747 may, when executed, provide any of a variety of online services, including and not limited to, online analytical processing (OLAP), statistical analysis of large quantities of data (sometimes referred to as data mining of "big data"), tracking of events in a manufacturing and/or distribution process, etc. One or more instances of one of the application routines 747 executed within the control device 300 and/or one or more node devices 700 may have requisites that include one or more resources provided by the control device 300, one or more of the resource devices 500 and/or one or more of the node devices 700. Alternatively or additionally, one or more instances of one or more application routines 747 may have requisites that include a dependency on one or more instances of another of the application routines 747 executed within another of the control device 300 and/or one or more of the node devices 700.

At a time prior to execution of the one or more application routines 747, configuration software installed on the control device 300 and the one or more node devices 700 may identify and/or exchange configuration information concerning the requisites of each application routine 747, including dependencies between different ones of the application routines 747. Such configuration information may then be used cooperatively by the control device 300 and/or the one or more node devices 700 to control the order in which VMs and/or instance(s) of the application routines 747 are started to accommodate such dependencies. Following starting of VMs and/or the application routines 747, such identification and/or exchanges of configuration information may be repeated on a recurring basis. In some embodiments, such recurrences may be scheduled to take place on a repeating interval of time. Checks of the status of each of the application routines 747 may also be made on the same recurring basis, and the execution of application routine 747 may be restarted if found to be in a nonfunctional state. Further, one or more of the application routines 747 may trigger a restarting of its own execution in response to detecting a change in a resource on which it depends. Where one of the application routines 747 is to be restarted, the control device 300 and/or the one or more node devices 700 may use the configuration information to cooperatively restart that application routine 747 and one or more others of the application routines 747 to again accommodate dependencies thereamong.

Each of the computing devices 100, 300, 500 and 700 may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc. Embodiments are not limited in this context.

As depicted and as will be discussed, these computing devices 100, 300, 500 and/or 700 may exchange communications in support of the execution of one or more application routines 747 through the network 999. However, one or more of the computing devices 100, 300, 500 and/or 700 may exchange other data entirely unrelated to such execution with each other and/or with still other computing devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which communications may be effected, including without limitation, wired technologies employing electrically and/or optically conductive cabling, and wireless technologies employing infrared, radio frequency or other forms of wireless transmission.

In various embodiments, the control device 300 may incorporate one or more of a processor component 350, a storage 360 and an interface 390 to couple the control device 300 to the network 999. The storage 360 may store one or more of an environment component 341 accompanied by environment parameters 331, a control agent 343, a requisites database 334, a query component 345, a configuration database 335, a control master 347 accompanied by control requisites data 333, a control parameter catalog 337, one or more of the application routines 747 that may each be accompanied by its own application requisites data 733, and one or more application parameter catalogs 737.

Correspondingly, in various embodiments, each of the node devices 700 may incorporate one or more of a processor component 750, a storage 760 and an interface 790 to couple each of the node devices 700 to the network 999. The storage 760 may store one or more of an environment component 741 accompanied by environment parameters 731, a control agent 743, one or more of the application routines 747 that may each be accompanied by its own application requisites data 733, and one or more application parameter catalogs 737.

Figure 2:
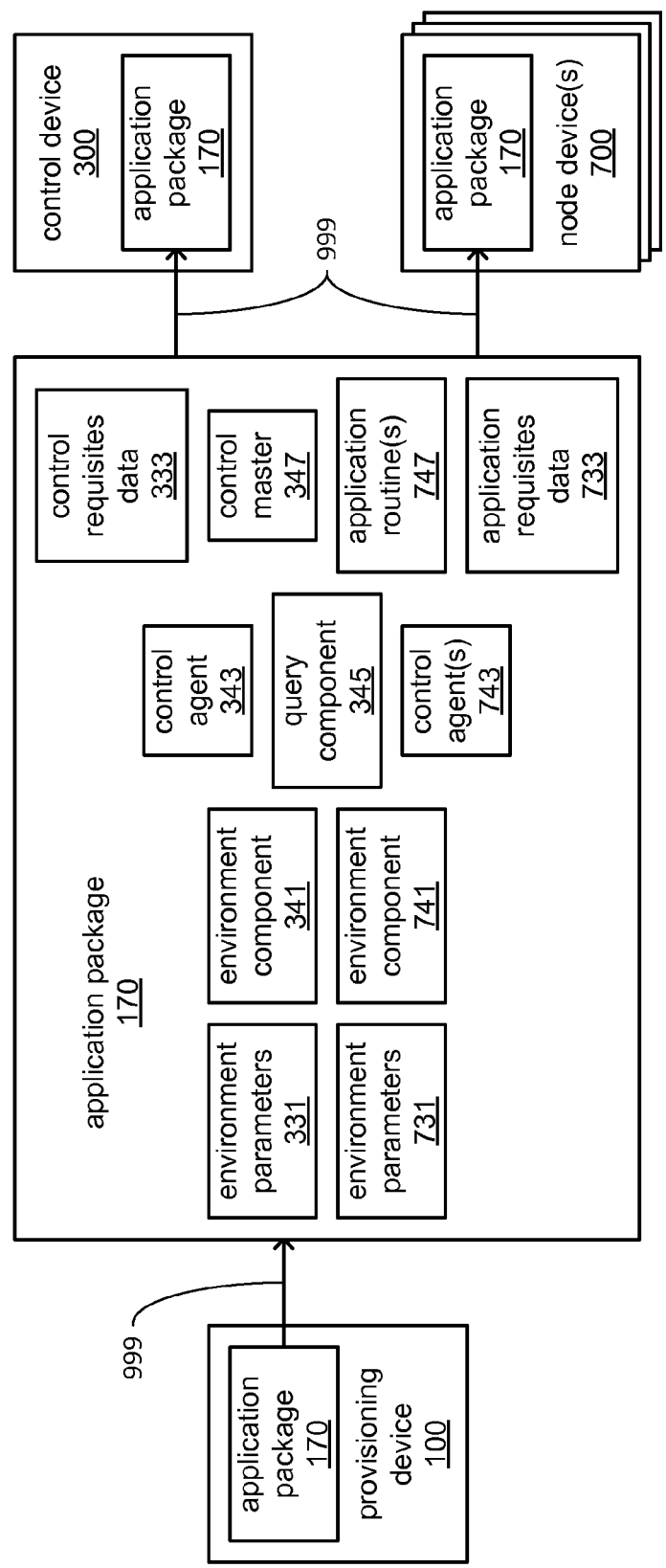
FIG. 2 illustrates an example embodiment of provisioning an analysis system with VM and application routines.

As previously discussed, the control device 300 and/or the one or more node devices 700 may be provided with VM environment routines and application routines via provision of the application package 170 from the provisioning device 100. FIG. 2 illustrates a block diagram of an example embodiment of the application package 170 and of such provisioning via the network 999. As depicted, the application package 170 may include one or more of the environment component 341 accompanied by the environment parameters 331, the environment component 741 accompanied by the environment parameters 731, the control master 347 accompanied by the control requisites data 333, the one or more application routines 747 accompanied by the application requisites data 733, the control agents 343 and 743, and the query component 345. Returning to FIG. 1, other data structures depicted as stored within the storage 360 of the control device 300 and the storage 760 of the one or more node devices 700 may be generated therein, as will shortly be explained in greater detail, and not supplied with the application package 170.

Within the control device 300, each of the environment component 341, the control agent 343, the query component 345, the control master 347, and at least one of the one or more application routines 747 may incorporate a sequence of instructions operative on the processor component 350 to implement logic to perform various functions when executed by the processor component 350. Correspondingly, within each of the one or more node devices 700, each of the environment component 741, the control agent 743, and at least one of the one or more application routines 747 may incorporate a sequence of instructions operative on the processor component 750 to implement logic to perform various functions when executed by the processor component 750. As familiar to those skilled in the art, in some embodiments, the sequence of instructions of one or more application routines 747 may need to be made operative on the processor component 350 and/or the processor component 750 through the provision of one or more VMs that enable execution of instructions meant for the instruction set of processor component by another processor component with a different instruction set.

Figure 3:
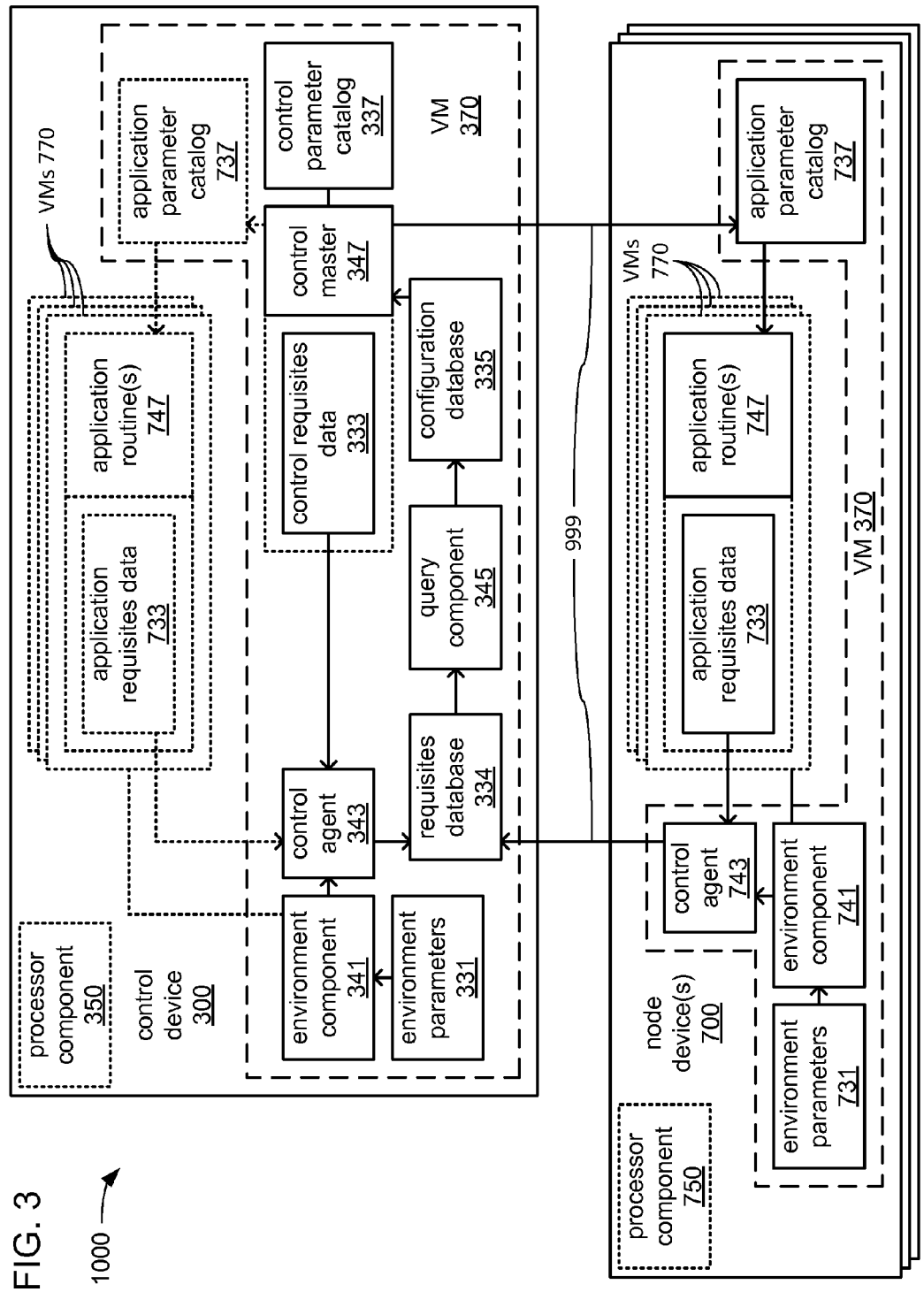
FIG. 3 illustrates an example embodiment of dynamically configuring VM environments and applications routine(s) executed therein.

FIG. 3 illustrates a block diagram of an example embodiment of execution of one or more of the environment component 341 and/or 741, the control agent 343 and/or 743, the query component 345, the control master 347, and at least one of the one or more application routines 747 by the processor components 350 and 750. In embodiments in which one or more of the control agents 343 and/or 743, the query component 345, the control master 347, and one or more of the application routines 747 are to be executed within a VM, one or more of each of the depicted VMs 370 and 770 may be generated within the control device 300 and/or one or more of the node devices 700. More specifically, in executing the environment component 341, the processor component 350 of the control device 300 may be caused to instantiate a VM 370 in which VM management functions may be performed, and one or more VMs 770 in which an instance of an application routine 747 may be executed. In instantiating the VMs 370 and/or 770, the processor component 350 may be caused to retrieve various parameters for doing so from the environment parameters 331, including and not limited to, quantity of VMs to instantiate, amounts of addressable storage space to allocate to each VM, amount of processing resources to provide each VM, how to respond to error conditions occurring within a VM, etc. Having instantiated the VMs 370 and/or 770, further execution of the environment component 341 may cause the processor component 350 to perform various hypervisor functions in which the processor component 350 recurringly monitors the state of each of these VMs and responds to various errors and/or other conditions that may arise within each.

Similarly, in executing the environment component 741, the processor component 750 of each of the node devices 700 may be similarly caused to instantiate a corresponding VM 370 in which VM management functions may be performed for VMs within that node device 700, and one or more of the VMs 770. In instantiating the VMs 370 and/or 770, the processor component 750 may be caused to retrieve various parameters for doing so from the environment parameters 731, including and not limited to, quantity of VMs to instantiate, amounts of addressable storage space to allocate to each VM, amount of processing resources to provide each VM, how to respond to error conditions occurring within a VM, etc. Having instantiated the VMs 370 and/or 770, further execution of the environment component 741 may cause the processor component 750 to perform various "hypervisor" functions in which the processor component 750 recurringly monitors the state of each of these VMs and responds to various errors and/or other conditions that may arise within each.

However, the hypervisor functions performed by the processor component 350 in executing the environment component 341 within the VM 370 of the control device 300 may be more extensive than those performed by the processor component 750 in executing the environment component 741 within the corresponding VM 370 of each of the node devices 700. More specifically, the processor component 350 may be caused to oversee the hypervisor functions performed by the processor component 750 within each of the one or more node devices 700. Thus, the parameters indicated within the environment parameters 331 and employed by the processor component 350 may differ from those indicated within the environment parameters 731 and employed by the processor component 750. In some embodiments, the environment components 341 and/or 741 may, for example, each be software routines implementing hypervisor and related functions from VMware® of Palo Alto, Calif. However, it is to be understood that what is described and claimed herein does not require and is not otherwise limited to the use of this particular software or any other particular software.

Following instantiation of the VMs 370 and/or 770, the processor components 350 and 750 may be further caused by the environment components 341 and 741 to begin execution of the control agents 343 and 743, respectively. In executing the control agent 343, the processor component 350 may perform a search within the control device 300 for the control requisites data 333 and for any instance of the application requisites data 733. Similarly, within each one of the one or more node devices 700, in executing the control agent 743, the processor component 750 of that one of the one or more node devices 700 may similarly perform a search within that one of the node devices 700 for any instance of the application requisites data 733.

As previously discussed, each instance of any of the application routines 747 may be required to be accompanied by an instance of the application requisites data 733. Therefore, each instance of the application requisites data 733 that is found within the control device 300 and/or within one or more of the node devices 700 may, by the simple fact of having been found, serve as an indication of an instance of an application routine 747 having been installed therein. Thus, the performance of searches for the control requisites data 333 and/or any instances of the application requisites data 733 may provide an indication to the control agents 343 and/or 743 of what routines (e.g., the control master 347 and/or any instance of an application routine 747) are installed within and are to be executed within the control device 300 and/or each one of the one or more node devices 700. Indeed, such searches may provide an indication to the control agents 343 and/or 743 of what routines are installed within each VM 370 and/or 770 based on which VMs 370 and/or 770 the control requisites data 333 and/or each instance of the application requisites data 733 are found within.

As depicted, there is a single control agent 343 or 743 within each VM 370 such that there is one control agent 343 within the control device 300 and one instance of the control agent 743 within each of the node devices. However, it should be understood that this is one example allocation of control agents among the computing devices 300 and 700 in which there may be one or more VMs instantiated. In other embodiments, the allocation of control agents may be such that there is a separate control agent within each VM 370 and 770 such that there may be more than one control agent within each of the computing devices 300 and 700. Specifically, in such other embodiments, each VM 770 may have its own instance of the control agent 743. Again, however, still other embodiments are possible in which no VMs may be instantiated. In such other embodiments, there may again be only one control agent 343 within the control device 300 and again only one instance of the control agent 743 within each of the node devices 700.

Upon finding the control requisites data 333 and any instances of the application requisites data 733 within the control device 300, the control agent 343 may retrieve indications of requisites for the execution of the control master 347 from the control requisites data 333. The control agent 343 may also retrieve indications of requisites for the execution of one or more instances of one or more of the application routines 747 that are to be executed within the control device 300 from those instances of the application requisites data 733 found therein (if any). Correspondingly, within each one of the node devices 700, upon finding any instances of the application requisites data 733 therein, the control agent 743 may retrieve indications of requisites for the execution of one or more instances of one or more application routines 747 that are to be executed within that one of the node devices 700 from those instances of the application requisites data 733 found therein. In some embodiments, the control agents 343 and/or 743 may each be an agent routine of, for example, the Puppet Enterprise™ software offered by Puppet Labs, Inc. of Portland, Oreg. However, it is to be understood that what is described and claimed herein does not require and is not otherwise limited to the use of this particular software or any other particular software.

In some embodiments (and as depicted with dotted lines), the control requisites data 333 may be embedded within or otherwise combined with the instructions of the control master 347, and similarly, the application requisites data 733 for each of the one or more application routines 747 may be embedded within or otherwise combined with the instructions of its corresponding one of the application routines 747. This may be deemed desirable as an approach to ensuring that indications of the requisites for execution of the control master 347 and/or of each of the one or more application routines 747 are always conveyed with those routines, instead of becoming separated therefrom in storage. However, in other embodiments, the control requisites data 333 and/or the application requisites data 733 for each of the one or more application routines 747 may be implemented as a separate data file or other data structure within which the various execution requisites may be indicated in any of a variety of ways. By way of example, the various indications of requisites within the control requisites data 333 and/or each such instance of the application requisites data 733 may be expressed in, for example, YAML™ (initials for either Yet Another Markup Language or YAML Ain't Markup Language) promulgated by three individual programmers, Oren Ben-Kiki, Clark Evans and Ingy dot Net. However, it is to be understood that what is described and claimed herein does not require and is not otherwise limited to the use of this particular language or any other particular language.

The requisites for execution of the control master 347 indicated within the control requisites data 333 and/or for execution of each instance of the one or more application routines 747 indicated within corresponding ones of the application requisites data 733 may include any of a variety of resources required of the hardware of the computing devices 300 and/or 700, of the VMs 370 and/or 770, and/or of one or more of the resource device 500. The resources indicated as required from the hardware of the computing devices 300 and/or 700 may include particular types and/or quantities of the processor components 350 and/or 750, particular minimum quantities of storage space within the storages 360 and/or 760, etc. Also, the resources indicated as required from the VMs 370 and/or 770 may include emulations of particular hardware components, provision of particular application programming interfaces (APIs), provision of particular levels of permission to access ranges of addresses and/or interfaces to networks, etc. Further, the resources indicated as required may include requisite pieces of configuration information needed to access and/or make use of resources provided by the one or more resource devices 500. Still further, the resources indicated in various ones of the application requisites data 733 as required by one or more of the application routines 747 may include pieces of data, callable functions and/or other resources provided by one or more others of the application routines 747 such that there may be dependencies among different ones of the application routines 747.

In addition to performing searches for and retrieving indications of requisites from the control requisites data 333 and instances of the application requisites data 733, the processor components 350 and 750 may be further caused by execution of the control agents 343 and 743 to perform various tests to determine what resources are available within the control device 300 and each of the node devices 700, respectively. Such tests may determine type and/or versions of each of the processor components 350 and/or 750, version levels of firmware of the computing devices 300 and/or 700, type and/or versions of the network interfaces 390 and/or 790 (see FIG. 1), quantities of available storage space within the storages 360 and/or 760, etc.

Following the performances of such tests and/or the retrieval of indications of requisites of the control master 347 from the control requisites data 333 and/or of each instance of the one or more application routines 747 from corresponding ones of the application requisites data 733, the control agents 343 and 743 may cooperate to combine indications of what resources were found in the tests and indications of such requisites to generate the requisites database 334. Thus, the requisites database 334 may become a single data structure made up of indications of requisites for at least the control master 347 and all of the application routines 747, as well as what resources are provided by the control device 300 and/or each of the one or more node devices 700 that may satisfy at least a subset of the requisites. For sake of efficiency, in so creating the requisites database 334, redundant indications of provided resources and/or of requisites may be eliminated.

Following generation of the requisites database 334, the query component 345 may retrieve indications of requisite pieces of configuration information that need to be provided by the one or more resource devices 500 (see FIG. 1) from the requisites database 334. The query component 345 may then communicate with the one or more resource devices 500 via the network 999 to retrieve those pieces of configuration information therefrom. However, as recognizable to those skilled in the art, there may be instances in which such communications may be unsuccessful such that not all of the requisite pieces of configuration information are so retrieved. To address this, indications retrieved from the control requisites data 333 and/or the application requisites data 733 of requisite pieces of configuration information required from the one or more resource devices 500 may be accompanied by indications of default pieces of configuration information to be used in instances where those pieces of configuration information cannot be retrieved.

The query component 345 may use the pieces of configuration information retrieved from the one or more resource devices 500 and/or such default pieces of configuration information (where necessary), along with indications of configuration information within the requisites database 334 from the earlier searches and tests, to generate the configuration database 335. Thus, the configuration database 335 may include indications of much of the same information as in the requisites database 334, but augmented with pieces of configuration information retrieved from the one or more resource devices 500.

In some embodiments, the control requisites data 333, instances of the application requisites data 733, the requisites database 334 and/or the configuration database 335 may be implemented as substantially similar types of files or data structures. As a result, the generation of the requisites database 334 from the control requisites data 333 and/or the application requisites data 733, and/or the generation of the configuration database 335 from the requisites database 334 may entail editing to add and/or change indications of requisites (including configuration information) already known and/or to be provided by the one or more resource devices 500. By way of example, the indications of requisites and/or of resourced found to be provided may be expressed in YAML within each of the control requisites data 333, the instances of the application requisites data 733, the requisites database 334 and/or the configuration database 335 such that the configuration database 335 may be generated by editing the YAML expressions of the requisites database 334, and/or the requisites database 334 may be generated by combining YAML expressions from the control requisites data 333 and the instances of the application requisites data 733.

Regardless of the format used in the configuration database 335, the control master 347 may use the indications of configuration information therein to generate the control parameter catalog 337 for the control device 300. The control parameter catalog 337 may include configuration information retrieved from the configuration database 335 for controlling the operation of the control master 347, itself. The control master 347 may also use the indications of configuration information in the configuration database 335 to generate an instance of the application parameter catalog 737 for the control device 300 in embodiments in which at least one instance of an application routine 747 is to be executed within the control device 300. Such an instance of the application parameter catalog 737 may include configuration information retrieved from the configuration database 335 for controlling the operation of all instances of any application routine 747 that is to be executed within the control device 300.

Similarly, the control master 347 may also use the indications of configuration information in the configuration database 335 to generate an instance of the application parameter catalog 737 for each of the one or more node devices 700. Like the instance of the application parameter catalog 737 that may be generated for the control device 300, each instance of the application parameter catalog 737 generated for one of the node devices 700 may include configuration information retrieved from the configuration database 335 for controlling the operation of all instances of any application routine 747 that is to be executed within that node device 700. The control master 347 may then transmit each such instance of the application parameter catalog 737 to its corresponding node device 700. In some embodiments, the control master 347 may transmit an indication of the availability of the instance(s) of the parameter catalog 737 to the one or more node devices 700, thereby enabling the control agent(s) 743 to each request its corresponding instance of the application catalog 737 from the control master 347 as a trigger for the control master 347 to thereby so transmit the instance(s) of the application parameter catalog 737. Thus, generation of the control parameter catalog 337 and all instances of the application parameter catalog 737 may be centralized with the control master 347.

However, in other embodiments, generation of at least the instances of the application parameter catalog 737 may be distributed across the control device 300 (in embodiments in which the one or more application routines 747 are executed within the control device 300) and/or the one or more node devices 700. More specifically, the configuration database 335 may be distributed by the processor component 350 from the control device 300 to the one or more node devices

700. The control agent 343 may use the indications of configuration information in the configuration database 335 to generate at least the control parameter catalog 337. The control agent 343 may also use the indications of configuration information in the configuration database 335 to generate an instance of the application parameter catalog 737 for the control device 300 in embodiments in which at least one instance of an application routine 747 is to be executed within the control device 300. Correspondingly, within each one of the one or more node devices 700, the control agent 743 may use the indications of configuration information in the configuration database 335 to generate an instance of the application parameters catalog 737 for use within that one of the node devices 700. Again, for each one of the one or more node devices 700, the instance of the application parameter catalog 737 generated within that one of the node devices 700 may include configuration information retrieved from the configuration database 335 for controlling the operation of all instances of any application routine 747 that is to be executed within that one of the one or more node devices 700.

Regardless of the exact manner in which each instance of the application parameter catalog 737 is generated and/or provided to a corresponding one of the node devices 700, each of those instances may list all instances of all application routines 747 to be executed among the control device 300 and/or any of the one or more node devices 700. In so listing all instances of all application routines 747 to be executed, each instance of the application parameter catalog 737 may indicate which ones of those instances of those application routines 747 are to be executed within the computing device 300 or 700 for which that instance of the application parameter catalog 737 was generated. Also, each instance of the application parameter catalog 737 may include the configuration information from the configuration database 335 that applies to the instances of the application routine(s) 747 that are to be executed within the computing device 300 or 700 for which that instance of the application parameter catalog 737 was generated, including indications of dependencies by any of those application routines 747 on other(s) of the application routines 747, whether they are executed within that same computing device 300 or 700, or are executed within others of the computing devices 300 and/or 700.

Within the control device 300, the control master 347 may use the configuration information within the control parameter catalog 337 to prepare to cooperate with each of the control agents 343 and/or 743 to oversee the execution of at least the instances of the one or more application routines 747 within the control device 300 and/or the one or more node devices 700. Within the control device 300 and/or each of the one or more node devices 700, the control agent 743 may use the configuration information within its corresponding instance of the application parameter catalog 737 to control the start of execution of any instance of one or more of the application routines 747 within that one of the computing devices 300 or 700. More specifically, the control master 347 and the control agents 743 of each of the computing devices 300 or 700 may each refrain from enabling the execution of instance(s) of application routine(s) 747 to start until at least the control master 347 and/or the control agents 743 are provided with corresponding ones of the control parameter catalogs 337 and/or 737. Once the parameter catalogs 337 and 737 are so provided, then the control agents 343 and 743 may cooperate through the control master 347 to cause the instances of the application routines 747 to be started in an order that is based on the indications of dependencies indicated in the instances of the application parameter catalogs 737 provided to the control agent 343 and/or corresponding ones of the control agents 743.

For example, where one application routine 747 to be executed in one of the node devices 700 is not indicated in an instance of a parameter catalog 737 provided to the control agent 743 of that node device 700 as having any dependencies on any other application routine 747, then that control agent 743 may enable execution of all instances of that one application routine 747 within that node device 700 to start without waiting for an indication relayed through the control master 347 of any of instance of any other application routine 747 having been started. Further, upon starting execution of those instances of that application routine 747, that control agent 743 may transmit an indication to the control master 347 within the control device 300 of the start of execution of those instances of that one application routine 747. The control master 347 may relay that indication of the start of execution of those instances of that one application routine 747 to the control agent 343 of the control device 300 and/or the control agents 743 of others of the node devices 700 to enable those other control agents 343 and/or 743 to start execution of other application routine(s) 747 that may have a dependency on the instances of the one application routine 747, which has already been started. Stated differently, as each instance of each application routine 747 is started, an indication is relayed to the control master 347 for distribution among the computing devices 300 and/or 700 to enable other(s) of the application routines 747 that have a dependency on that instance of that application routine 747 to also be started.

As the control master 347 is started, the control master 347 may retrieve one or more pieces of configuration information provided to enable its execution in the control parameter catalog 337. In some embodiments, such configuration information may include indications of what instances of which application routines 747 are to be executed within each computing device 300 and/or 700. Such configuration information may also include a listing of the all of the control agents 343 and/or 743 with which the control master 347 is to interact. Correspondingly, as each instance of each application routine 747 is started, the control agent 343 or the instance of the control agent 743 involved in that start of that instance of that application routine 747 may provide that instance of that application routine 747 with one or more pieces of configuration information from a corresponding one of the application parameter catalog 737 to enable its execution.

Following commencement of execution of the various instances of the one or more application routines 747 that may occur within the control device 300 and/or one or more node devices 700, the aforedescribed approach to discovering requisites for the execution of the application routines 747 and for generating the parameter catalogs 337 and/or 737 to provide configuration information based on those requisites may be repeated on a recurring basis. Again, such repetition may be scheduled to occur at a recurring interval of time. Alternatively or additionally, such repetition may be triggered manually by personnel overseeing the operation of the online services system 1000. More specifically, the control agents 343 and/or 743 may repeat the tests and/or searches for the control requisites data 333 and any instances of the application requisites data 733 as part of an approach to accepting changes in configuration information. It should be noted that regardless of whether the requisites uncovered in a repetition of the tests and/or searches differ from the requisites previously uncovered by such testing and/or searches, the control agents 343 and/or 743 may repeat the generation of the requisites database 334.

Where the requisites database 334 includes indications of pieces of configuration information that need to be provided by the one or more resource devices 500, the query component 345 may again attempt to communicate with the one or more resource devices 500 to retrieve such configuration information. Regardless of whether there is configuration information that needs to be provided by the one or more resource devices 500, the query component 345 may then generate a new version of the configuration database 335. Following generation of the new version of the configuration database 335, the control master 347 or the control agents 343 and/or 743 may generate new versions of the control parameter catalog 337 and/or one or more instances of the application parameter catalog 737, regardless of whether there is actually a change in the configuration information in the new version of the configuration database 335 from the previous version of the configuration database 335, or not.

In response to being provided with new versions of the parameter catalogs 337 and/or 737, the control agents 343 and/or 743, respectively, may perform a status check of whether each instance of each application routine 747 indicated therein as being executed on a particular one of the computing devices 300 or 700 is actually currently being so executed. Where a new application routine 747 has been added to those that are to be executed on a particular one of the computing devices 300 or 700, a corresponding one of the control agents 343 or 743 may enable the start of execution of that new application routine 747. Where execution of an application routine 747 was earlier started within a particular one of the computing devices 300 or 700, but is found to have become in some way nonfunctional (e.g., has become unresponsive or has ceased to be executed due to an error), a corresponding one of the control agents 343 or 743 within that computing device may restart execution of that nonfunctional application routine 747.

In embodiments in which there are dependencies among instances of application routines 747 or among two or more different application routines 747, the control agents 343 and/or 743 may act to ensure that those dependencies are accommodated as part of starting execution of a new application routine 747 and/or restarting a nonfunctional application routine 747. Specifically, as each of the control agents 343 and/or 743 checks the status of execution of each of the application routines 747 within its corresponding one of the computing devices 300 or 700, that one of the control agents 343 and/or 743 may provide an indication to the control master 347 of application routine(s) 747 that are still being executed (e.g., still "running"). Such indications may then be relayed by the control master 347 to others of the control agents 343 and/or 743 within others of the computing devices 300 and/or 700, respectively. However, where one of the control agents 343 or 743 has found that an application routine 747 that was previously started is found to be nonfunctional, then that one of the control agents 343 or 743 may await the receipt through the control master 347 of indications that any application routine 747 executed in another of the computing devices 300 or 700 and on which the nonfunctional application routine 747 depends is still running, has been started or has been restarted before enabling a restart of the execution of the nonfunctional application routine 747. Further, one of the control agents 343 or 743 has found that a new application routine 747 is to be executed within the corresponding one of the computing devices 300 or 700, respectively, then that one of the control agents 343 or 743 may await the receipt of indications that any application routine 747 executed in another of the computing devices 300 or 700 and on which the new application routine 747 depends is still running, has been started or has been restarted before enabling the start of execution of the new application routine 747.

It is the use of searches for information concerning requisites of one or more application routines 747 within the control device 300 and/or the one or more node devices 700 that may allow the configuration of each instance of each of the one or more application routines 747 to be dynamic. Alternatively or additionally, it may be the repetition of such searches for configuration information required for the execution of the one or more application routines 747, coupled with the repeated re-generation of the parameter catalogs 337 and 737 therefrom that may allow the configuration of each instance of each of the one or more application routines 747 to be dynamic. More simply, the configuration information required by each instance of each application routine 747 is made more easily changeable in response to changes in computing devices (e.g., upgrades or updates), changes to resources provided by computing devices access and/or changes in dependencies between application routines 747.

Returning to FIG. 1, in various embodiments, each of the processor components 350, 550 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked.

FIGS. 4A-E, together, illustrate an example embodiment of the online services system 1000 in which one or more instances of each of four application routines 747a, 747b, 747c and 747d are distributed among two node devices 700x and 700y for execution. In this example, there may be dependencies among the application routines 747a-d such that the application routine 747d depends on a resource provided by the application routine 747c, which may depend on a resource provided by the application routine 747b, which in turn may depend on a resource provided by the application routine 747a. As depicted, in embodiments in which one or more of the application routines 747a-d are executed in VMs 770, an instance of the environment component 741 may be executed within one or both of the node devices 700x and 700y to each provide one or more of the VMs 770. Thus, in such embodiments, one or more of the application routines 747a-d may have a dependency on a VM 770, which in turn may be dependent upon an instance of the environment component 741 to be instantiated and/or maintained.

Figure 4A:
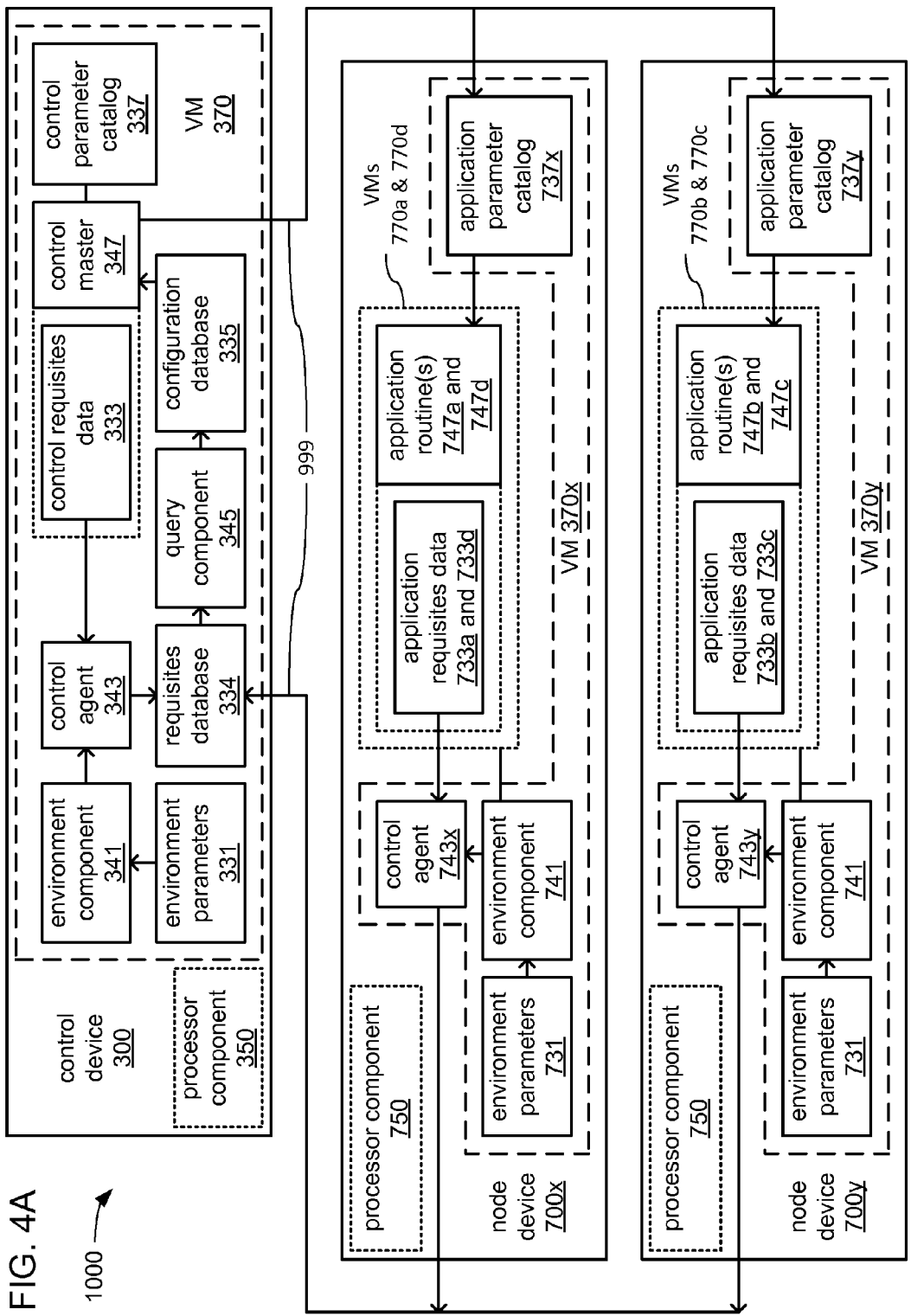
FIGS. 4A, 4B, 4C, 4D and 4E, together, illustrate another example embodiment of dynamically configuring VM environments and applications routine(s) executed therein.

As depicted in FIG. 4A, the application routines 747a and 747d may have earlier been loaded into the node device 700x for execution within separate VMs 770a and 770d, respectively, that may be provided by the environment component 741 from within a VM 370x of the node device 700x. Also, the application routines 747b and 747c may have earlier been loaded into the node device 700y for execution within separate VMs 770b and 770c, respectively, that may be provided by the environment component 741 from within a VM 370y of the node device 700y. Again, in embodiments in which one or more of the application routines 747a-d are executed within a VM, the corresponding instance of the environment component 741 may retrieve parameters for providing that VM from a corresponding instance of the environment parameters 731. However, it should again be noted that embodiments are possible in which no VMs are used. As also depicted, each of the application routines 747a-d may be accompanied by corresponding ones of the application requisites data 733a-d that include indications of requisites for the execution of each of the application routines 747a-d, including any dependencies on resources from one or more others of the application routines 747a-d.

Figure 4B:
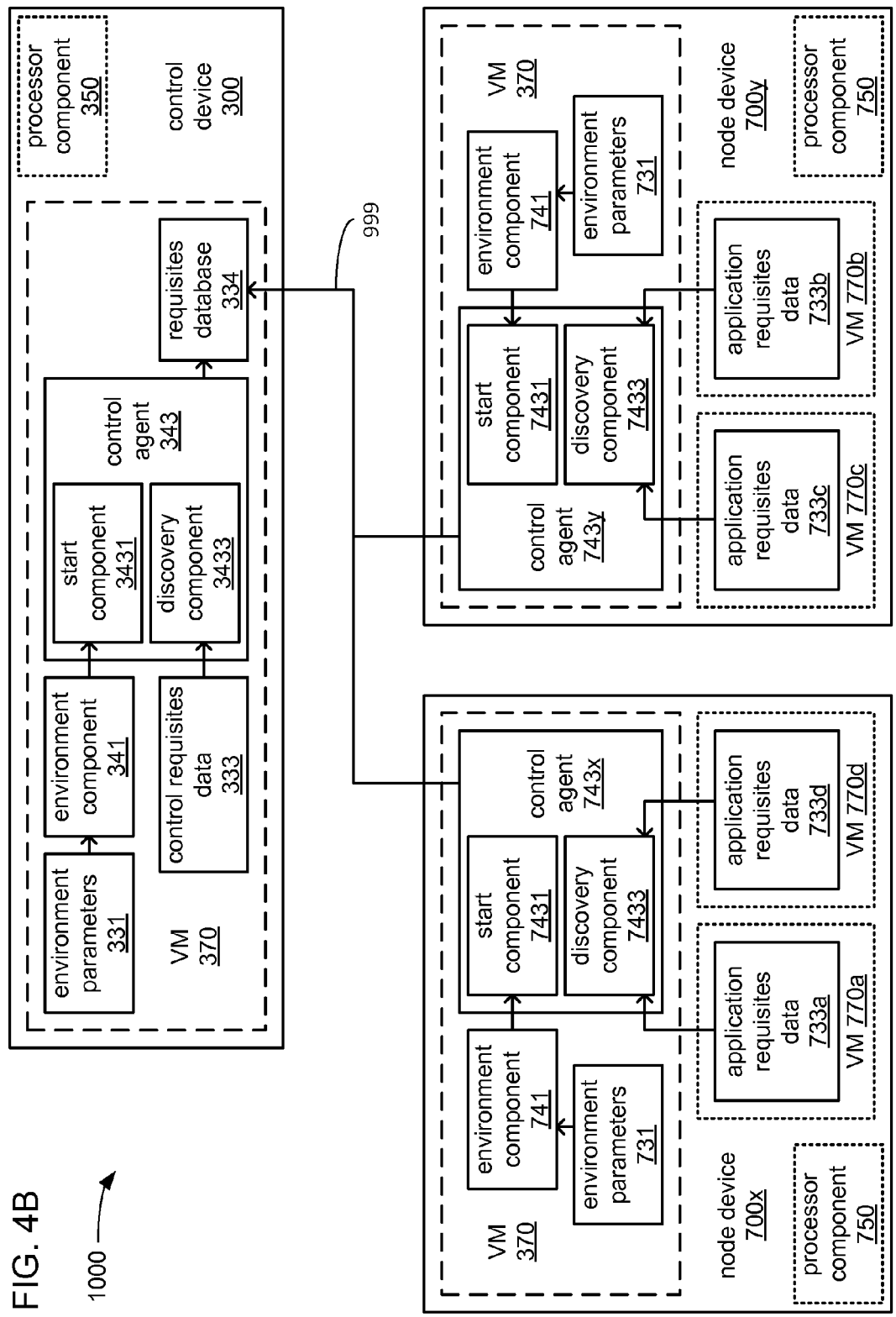

Turning to FIG. 4B, upon powering up and/or resetting of each of the node devices 700x and 700y, the instances of the environment component 741 within each of these node devices may instantiate a VM 370 and corresponding ones of the VMs 770a-d in embodiments in which VMs are employed. The environment components 741 within each of the node devices 700x and 700y may also provide an indication to a start component 7431 of corresponding ones of the control agents 743x and 743y of the instantiation of these VMs such that each of the control agents 743x and 743y may proceed with enabling the start of execution of application routines. Similarly, upon powering up and/or resetting of the control device 300, the environment component 341 thereof may instantiate at least a VM 370 in embodiments in which VMs are employed. The environment component 341 may also provide an indication to a start component 3431 of the control agent 343 of the instantiation of at least the VM 370 such that the control agent 343 may proceed within enabling the start of execution of the control master 347.

As part of enabling the execution of application routines, the control agents 743x and 743y may perform various tests to determine what resources are provided by the node devices 700x and 700y, respectively, and may search for instances of application requisites data. More specifically, a discovery component 7433 of the control agent 743x may perform such a search and may locate the application requisites data 733a and 733d. As previously discussed, the fact of locating an instance of application requisites data for an application routine may serve as the indication of that application routine having been loaded for execution within a particular computing device, and may further serve as the indication of that application routine having been loaded for execution within a particular VM in embodiments in which VMs are employed. Thus, the locating of the application requisites data 733a and 733d within the node device 700x may serve as the indication that the application routines 747a and 747d are loaded within the node device 700x for execution therein. Further, in embodiments in which VMs are employed, the locating of the application requisites data 733a and 733d within the VMs 770a and 770d (e.g., within addressable space allocated to the VMs 770a and 770d) may serve as the indication that the application routines 747a and 747d are loaded within the node device 700x for execution within the VMs 770a and 770d, respectively. Similarly, in embodiments in which VMs are employed the locating of the application requisites data 733b and 733c within the node device 700y may serve as the indication that the application routines 747b and 747c are loaded within the node device 700y for execution therein. Further, the locating of the application requisites data 733b and 733c within the VMs 770b and 770c (e.g., within addressable space allocated to the VMs 770b and 770c) may serve as the indication that the application routines 747b and 747c are loaded within the node device 700y for execution within the VMs 770b and 770c, respectively.

Upon locating the application requisites data 733a and 733d, the discovery component 7433 of the control agent 743x may retrieve indications of the requisites for executing the application routines 747a and 747d, respectively, therefrom. Within the application requisites data 733d may be an indication of the dependency of the application routine 747d on at least one resource from the application routine 747c. Similarly, upon locating the application requisites data 733b and 733c, the discovery component 7433 of the control agent 743y may retrieve indications of the requisites for executing the application routines 747b and 747c, respectively, therefrom. Within the application requisites data 733c may be an indication of the dependency of the application routine 747c on at least one resource from the application routine 747b, and within the application requisites data 733b may be an indication of the dependency of the application routine 747b on at least one resource from the application routine 747a.

Correspondingly, as part of enabling the execution of the control master 347, a discovery component 3433 of the control agent 343 may perform various tests to determine what resources are provided by the control device 300, and may search for the control requisites data 333. In embodiments in which one or more application routines may also be executed within the control device 300, the discovery component 3433 of the control agent 343 may also search for instances of application requisites data corresponding to such application routine(s). Upon locating the control requisites data 333, the discovery component 3433 of the control agent 343 may retrieve indications of the requisites for executing the control master 347.

With requisites for the execution of the control master 347 retrieved from the control requisites data 333 by the discovery component 3433, and with the requisites for execution of the application routines 747a-d retrieved from the application requisites data 733a-d by corresponding instances of the discovery component 7433, the discovery components 3433 and 7433 may cooperate to generate the requisites database 334. More specifically, the discovery component 3433 may initially generate the requisites database 334 to include indications of requisites for the execution of at least the control master 347, and each of the instances of the discovery components 7433 may augment the requisites database 334 with indications of requisites for the execution of each of the application routines 747a-d.

Figure 4C:
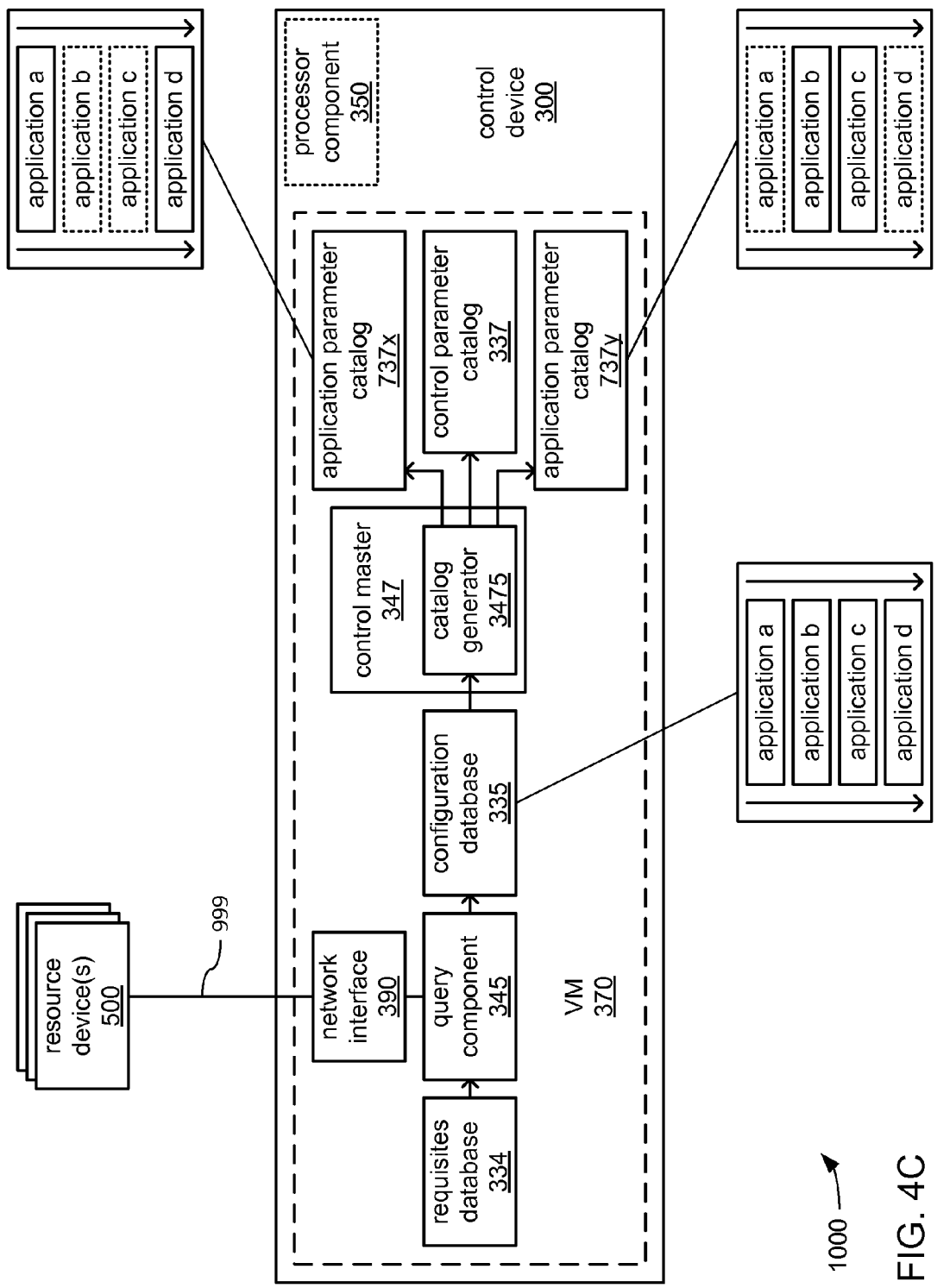

Turning to FIG. 4C, as has been discussed, among the requisites for execution of the control master 347 and/or one or more application routines (e.g., the application routines 747a-d), may be requisites for pieces of configuration information to be provided by one or more of the resource devices 500. If such pieces of information are so required, then the query component 345 may operate the network interface 390 of the control device 300 to communicate with one or more of the resource devices 500 via the network 999 to obtain such requisite piece(s) of configuration information. The query component 345 may then add the pieces of configuration information received from one or more of the resource devices (or default values to be used in place of any of such configuration information not so received) to the indications of configuration in the requisites database 334 that are already known to generate the configuration database 335.

More broadly, in generating the configuration database 335, indications of resources provided by one or more of the computing devices 300, 500 and/or 700, as well as resources provided by one or more of the VMs 370 and/or 770a-d may be matched to indications of resources needed (requisites) for the execution of the control master 347 and/or the application routines 747a-d. As a result, the configuration database 335 may include pointers or other form of references to various resources required by one or more of the control master 347 and/or the application routines 747a-d, thereby enabling each to retrieve those resources. By way of example, an indication of a callable library needed by one of the application routines 747a-d may be matched to a pointer to such a library provided within the VM of the one of the nodes 700x-y in which that one of the application routines 747a-d is to be executed.

Within the configuration database 335 may also be formed a single indication or data structure (or combination of indications or data structures) of the dependencies that may exist among the application routines 747a-d. Alternatively, either in lieu of or in addition to such a centralized indication of all of such dependencies, a indication may be provided in the configuration data 335 of an order in which the application routines 747a-d are to be started and/or restarted to ensure that any dependencies thereamong are addressed.

Following generation of the configuration database 335, a catalog generator 3475 of the control master 347 may generate individual parameter catalogs for each of the computing devices 300 and 700 of the analysis system 1000. More specifically, the catalog generator 3475 may generate the control parameter catalog 337, which may include configuration information from the configuration database 335 that is required for the execution of the control master 347. The catalog generator 3475 may also generate application parameter catalogs 737x and 737y, each of which may include configuration information from the configuration database 335 that is required for the execution of corresponding ones of the application routines 747a-d within corresponding ones of the node devices 700x and 700y.

Each of the application parameter catalogs 737x-y may include a listing of any instance of each of the application routines 747a-d to be executed, along with indications of which of the node devices 700x or 700y that each is to be executed within. Within such a listing may be indications of dependencies among the application routines 747a-d. By way of example, within the application parameter catalog 737x generated for the node device 700x, all of the application routines 747a-d may be listed despite the fact that neither of the application routines 747b or 747c are to be executed within the node device 700x. For each of the application routines 747a and 747d (which are to be executed within the node device 700x), the application parameter catalog 737x may include indications of configuration information, including indications of any dependencies on any others of the application routines 747a-d, regardless of where those others of the application routines 747a-d are to be executed. Thus, within the application parameter catalog 737x, the application routine 747a may be indicated as having no dependencies on any other of the application routines 747b-d, while the application routine 747d may be indicated as having a dependency on at least one resource from the application routine 700c (which is to be executed within the node device 700y). Correspondingly, within the application parameter catalog 737y generated for the node device 700y, the application routine 747c (which is to be executed within the node device 700y) may be indicated as having a dependency on at least one resource from the application routine 747b (which is also to be executed within the node device 700y), and the application routine 747b may be indicated as having a dependency on at least one resource from the application routine 700a (which is to be executed within the node device 700x).

Figure 4D:
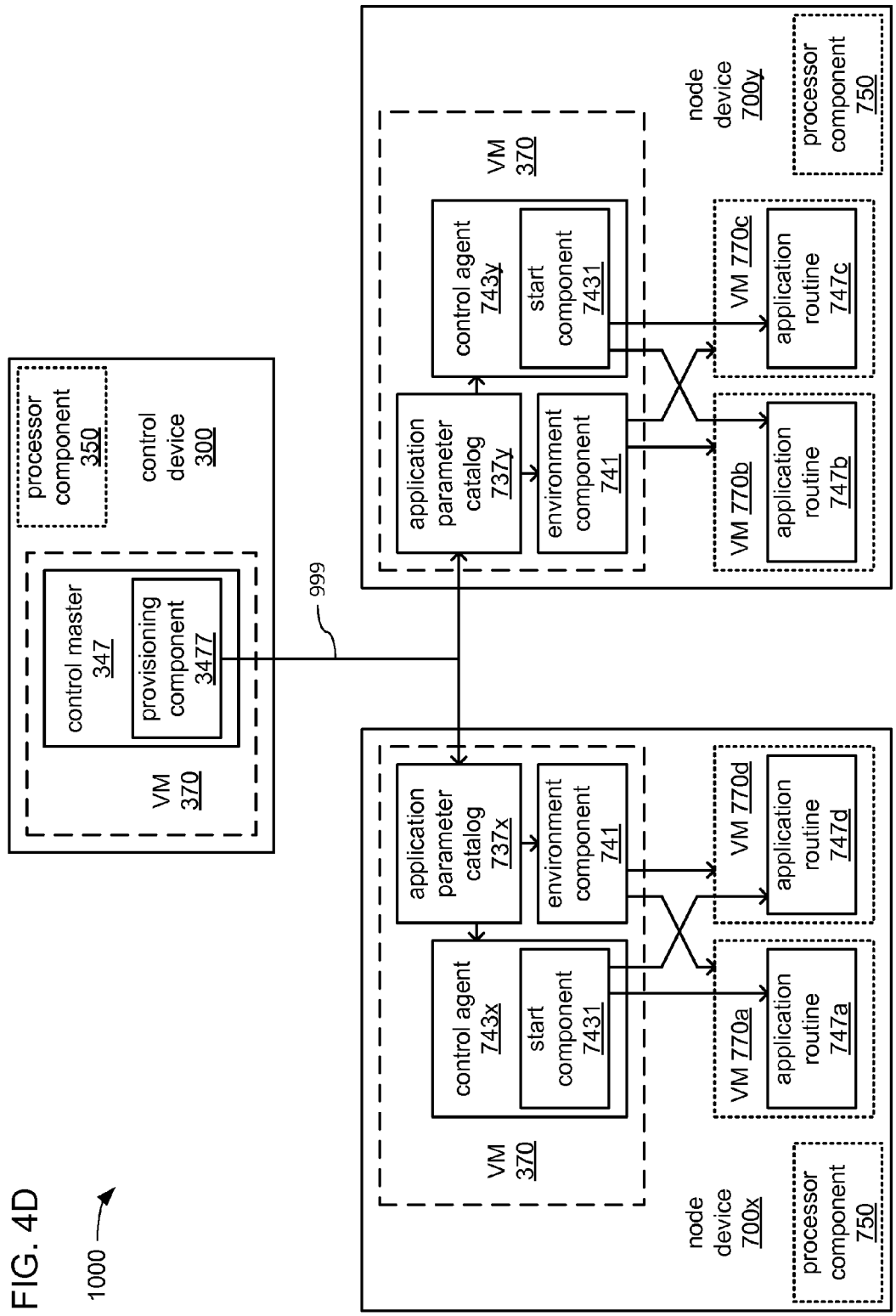

Turning to FIG. 4D, following generation of the application parameter catalogs 737x and 737y, a provisioning component 3477 of the control master 347 may transmit the application parameter catalog 737x to the node device 700x, and may transmit the application parameter catalog 737y to the node device 700y. In some embodiments, the provisioning component 3477 may transmit an indication of the availability of the application catalogs 737x and/or 737y to control agents 743x and/or 743y, respectively, and may then so transmit the application catalogs 737x and/or 737y. In other embodiments, the application catalogs 737x and/or 737y may be so transmitted in response to requests for parameter catalogs received by the provisioning component 3477 from the control agents 743x and/or 743y. Within each of the node devices 700x and 700y, the environment components 741 may employ one or more of the pieces of configuration information provided within the application parameter catalogs 737x and 737y, respectively, in configuring corresponding ones of the VMs 770a-d to support the execution of corresponding ones of the application routines 747a-d.

Prior to such receipt of the application parameter catalogs 737x and 737y, the start components 7431 of the control agents 743x and 743y, respectively, may refrain from enabling the execution of any of the application routines 747a-d to be started. However, upon receipt of the application parameter catalogs 737x and 737y, the start components 7431 of the control agents 743x and 743y may employ the indications of dependencies and/or of starting order of the application routines 747a-d within the application parameter catalogs 737x and 737y, respectively, to coordinate the start of execution of the application routines 747a-d through the control master 347.

More specifically, prior to receiving the application parameter catalog 737x, the start component 7431 of the control agent 743x may refrain from enabling execution of either of the application routines 747a or 747d to be started by the processor component 750 of the node device 700x. However, upon receiving the application parameter catalog 737x, and upon retrieving an indication therefrom that the application routine 747a is not in any way dependent on any of the other application routines 747b-d, the start component 7431 of the control agent 743x may enable execution of the application routine 747a by the processor component 750 of the node device 700x to start. In contrast, upon retrieving an indication from the application parameter catalog 737x that the application routine 747d is dependent upon at least one resource from the application routine 747c, the start component 7431 of the control agent 743x may continue to refrain from enabling execution of the application routine 747d from starting, even as the application routine 747a is started. Correspondingly, prior to receiving the application parameter catalog 737y, the start component 7431 of the control agent 743y may refrain from enabling execution of either of the application routines 747b or 747c to be started by the processor component 750 of the node device 700y. Further, upon receiving the application parameter catalog 737y, and upon retrieving an indication therefrom that the application routine 747c is dependent on the application routine 747b, and that the application routine 747b is dependent on the application routine 747a, the start component 7431 of the control agent 743y may continue to refrain from enabling execution of either of the application routines 747b or 747c from starting.

Figure 4E:
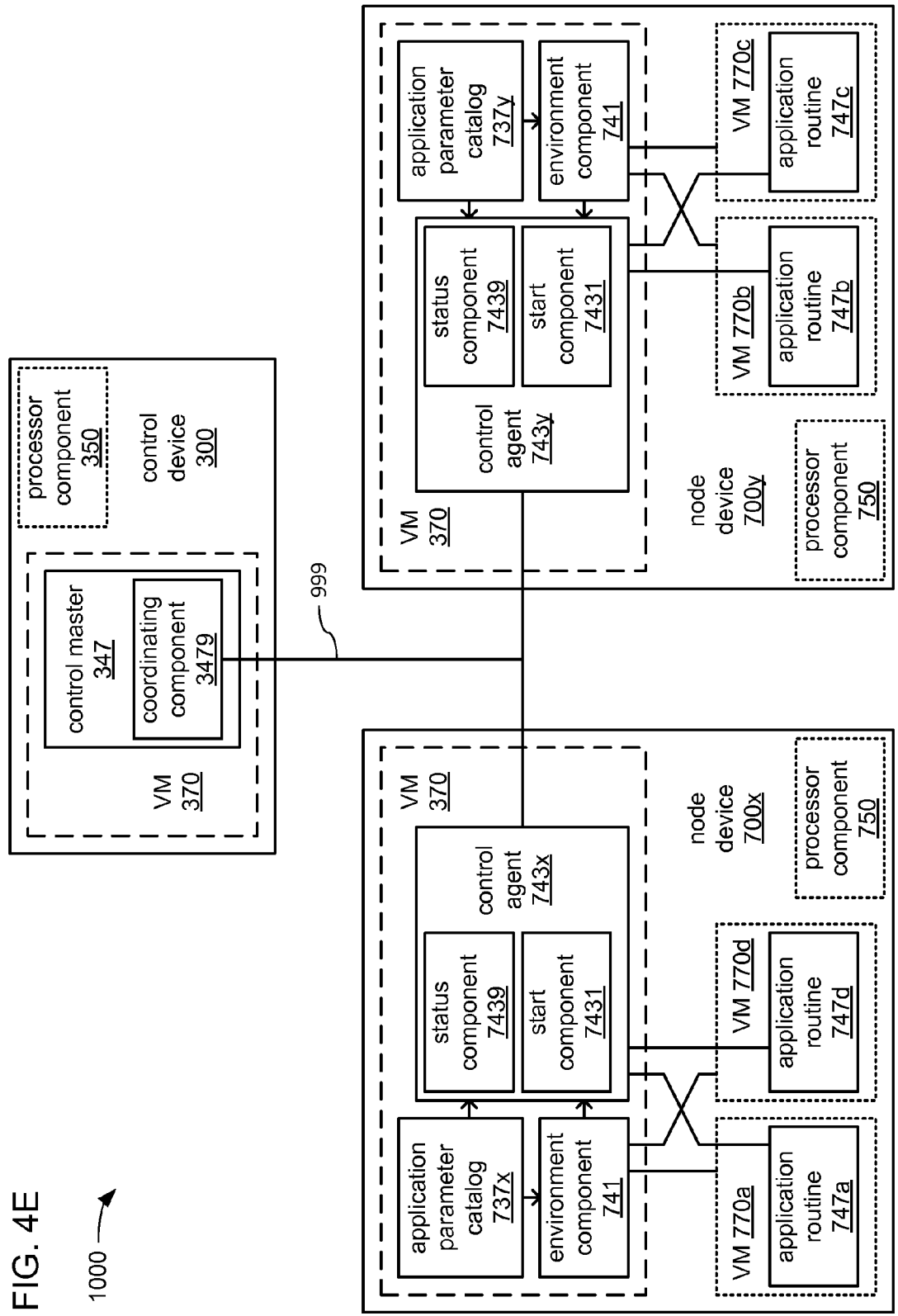

Turning to FIG. 4E, indications of events such as the starting or restarting of execution of one of the application routines 747a-d may be relayed between the node devices 700x-y through the control master 347. More specifically, a status component 7439 of the control agent 743x may transmit an indication to a coordinating component 3479 of the control master 347 that execution of the application routine 747a has been started within the node device 700x. The coordinating component 3479 may then relay that indication to the control agent 743y within the node device 700y.

In response to the receipt of the indication that the application routine 747a has been started, and as a result of the dependency of the application routine 747b on the application routine 747a, the start component 7431 of the control agent 743y may enable the start of execution of the application routine 747b by the processor component 750 of the node device 700y. With the start of execution of the application routine 747b, a status component 7439 of the control agent 743y may transmit an indication to the coordinating component 3479 of the control master 347 that execution of the application routine 747b has been started within the node device 700y. In turn, the coordinating component 3479 may then relay that indication to the control agent 743x within the node device 700x. However, since neither of the application routines 747a or 747d are dependent on the application routine 747b, the start component 7431 of the control agent 743x may take no action in response to the received indication of the start of execution of the application routine 747b.

However, with execution of the application routine 747b now started, and as a result of the dependency of the application routine 747c on the application routine 747b, the start component 7431 of the control agent 743y may then also enable the start of execution of the application routine 747c by the processor component 750 of the node device 700y. With the start of execution of the application routine 747c, the status component 7439 of the control agent 743y may transmit an indication to the coordinating component 3479 of the control master 347 that execution of the application routine 747c has been started within the node device 700y. In turn, the coordinating component 3479 may then relay that indication to the control agent 743x within the node device 700x.

In response to the receipt of the indication that the application routine 747c has been started, and as a result of the dependency of the application routine 747d on the application routine 747c, the start component 7431 of the control agent 743x may enable the start of execution of the application routine 747d by the processor component 750 of the node device 700x. With the start of execution of the application routine 747d, the status component 7439 of the control agent 743x may transmit an indication to the coordinating component 3479 of the control master 347 that execution of the application routine 747d has been started within the node device 700x. In turn, the coordinating component 3479 may then relay that indication to the control agent 743y within the node device 700y. However, since neither of the application routines 747b or 747c are dependent on the application routine 747d, the start component 7431 of the control agent 743y may take no action in response to the received indication of the start of execution of the application routine 747d.

Thus, through the indications of dependencies and/or of starting order of the application routines 747a-d indicated within each of the application parameter catalogs 737x and 737y, and through such exchanges of indications of when each of the application routines 747a-d have been started, the control agents 743x and 743y are able to coordinate the start of execution of the application routines 747a-d through the control master 347 in an order that addresses the dependencies among them. Following such starting of execution of the application routines 747a-d, the control agents 743x and 743y may continue to coordinate through the control master 347 to handle instances in which an event associated with one of the application routines 747a-d necessitates the restarting of one or more others of the application routines 747a-d.

More specifically and as an example, if an event occurs that in some way affects the execution of application routine 747b, including events that entail restarting execution of application routine 747b, then the control agents 743x and 743y may coordinate through the control master 347 to effect restarting execution of the application routines 747c and 747d, based on the dependency of the application routine 747d on the application routine 747c and the dependency of the application routine 747c on the application routine 747b. For instance, the application routine 747b may detect a change in a resource on which it depends that necessitates a restart of execution of the application routine 747b, and the application routine 747b may provide an indication of the need to be so restarted to the start component 7431 of the control agent 743y. In response to such an indication, the start component 7431 of the control agent 743y may restart the execution of the application routine 747b. In response to the restarting of the application routine 747b, the status component 7439 of the control agent 743y may transmit an indication of the restarting of the application routine 747b to the coordinating component 3479. The coordinating component 3479 may then relay that indication to the control agent 743x of the node device 700x, however, as neither of the application routines 747a or 747d is dependent on the application routine 747b, the start component 7431 of the control agent 743x may take no action in response to such an indication concerning the application routine 747b.

However, as a result of the restarting of the application routine 747b, and as a result of the dependency of the application routine 747c on the application routine 747b, the start component 7431 of the control agent 743y may also restart the application routine 747c. In response to the restarting of the application routine 747c, the status component 7439 of the control agent 743y may transmit an indication of the restarting of the application routine 747c to the coordinating component 3479, which in turn may relay that indication to the control agent 743x of the node device 700x. While the start component 7431 of the control agent 743x may have taken no action in response to the restarting of the application routine 747b, the dependency of the application routine 747d on the application routine 747c may result in the start component 7431 of the control agent 743x restarting the application routine 747d. In response to the restarting of the application routine 747d, the status component 7439 of the control agent 743x may transmit an indication to the coordinating component 3479 of the control master 347 that execution of the application routine 747d has been restarted within the node device 700x. In turn, the coordinating component 3479 may then relay that indication to the control agent 743y within the node device 700y. However, since neither of the application routines 747b or 747c are dependent on the application routine 747d, the start component 7431 of the control agent 743y may take no action in response to the received indication of the restarting of execution of the application routine 747d.

Throughout this series of restarts of the application routines 747b-d, the application routine 747a may be not be restarted. More precisely, neither the indications of the restarting of the application routines 747b or 747c received through the coordinating component 3479, nor the restarting of the application routine 747d within the node device 700x may trigger the start component 7431 of the control agent 743x to effect a restart of the application routine 747a. This may arise from the lack of dependency by the application routine 747a on any of the application routines 747b-d such that there may be no need to restart the application routine 747a.

Also following the start of execution of the application routines 747a-d, and as previously discussed, the discovery of requisites for the execution of the application routines 747a-d, and the generation of the requisites database 334, the configuration database 335 and the parameter catalogs 337 and 737x-y may be repeated on a recurring basis (e.g., scheduled to occur at an interval of time) or may be manually triggered to be repeated. More specifically, and regardless of the manner in which it is triggered, the discovery components 3433 and 7433 may repeat their various tests and/or searches for requisites data, and may cooperate to again generate the requisites database 334, as described earlier with regard to FIG. 4B. The query component 345 may then use this new version of the requisites database 334 as a basis for new communications with the one or more resource devices 500 to obtain any needed configuration information and/or to again generate the configuration database 335. The catalog generator 3475 of the control master 347 may then use this new version of the configuration database 335 to generate corresponding new versions of each of the control parameter catalog 337 and the application parameter catalogs 737x and 737y as described earlier with regard to FIG. 4C.

Following generation of the new versions of each of the parameter catalogs 337 and 737x-y, the provisioning component 3477 of the control master 347 may again transmit the application parameter catalog 737x to the node device 700x, and may again transmit the application parameter catalog 737y to the node device 700y, as described earlier with regard to FIG. 4D. However, instead of the control agents 743x and 743y employing these new versions of the application parameter catalogs 737x and 737y, respectively, to coordinate the start of execution of corresponding ones of the application routines 747a-d, the control agents 743x and 743y may employ the new versions of the application parameter catalogs 737x and 737y, respectively, to check the status of execution of corresponding ones of the application routines 747a-d.

More precisely, the status component 7439 of the control agent 743x may retrieve indications of what application routines are to be executed within the node device 700x from the new version of the application parameter catalog 737x, and may determine that the application routines 747a and 747d are still to be executed within the node device 700x. In response, the status component 7439 of the control agent 743x may check the status of each of the application routines 747a and 747d. Presuming that both of the application routines 747a and 747d are still being executed by the processor component 750 of the node device 700x, the status component 7439 of the control agent 743x may transmit an indication to that effect to the control master 347 within the control device 300. In turn, the control master 347 may relay that indication of both of the application routines 747a and 747d still being executed to the control agent 347y within the node device 700y. Correspondingly, the status component 7439 of the control agent 743y may retrieve indications of what application routines are to be executed within the node device 700y from the new version of the application parameter catalog 737y, and may determine that the application routines 747b and 747c are still to be executed within the node device 700y. In response, the status component 7439 of the control agent 743y may check the status of each of the application routines 747b and 747c. Presuming that both of the application routines 747b and 747c are still being executed by the processor component 750 of the node device 700y, the status component 7439 of the control agent 743y may transmit an indication to that effect to the control master 347 within the control device 300. In turn, the control master 347 may relay that indication of both of the application routines 747b and 747c still being executed to the control agent 347x within the node device 700x.

Presuming that all of the application routines 747a-d are still executed within corresponding ones of the node devices 700x-y, such exchanged indications to the effect that each of the application routines 747a-d is still being so executed may not be acted upon within either of the node devices 700x or 700y. However, if for instance the status component 7439 of the control agent 743y discovers that the application routine 747b is in some way nonfunctional (e.g., has become unresponsive despite still being executed, or is no longer being executed as a result of an error or other condition) such that execution of the application routine 747b needs to be restarted, then exchanges of indications that the other application routines 747a and/or 747c-d are still running may be put to use in one or both of the node devices 700x-y.

More specifically, due to the indication in the new version of the application parameter catalog 737y of the dependency by the application routine 747b on a resource provided by the application routine 747a executed within the node device 700x, the start component 7431 of the control agent 743y may refrain from restarting execution of the application routine 747b until the control agent 743y is provided with an indication of the application routine 747a as still being executed or as having its execution restarted. Presuming that the application routine 747a was determined by the status component 7439 of the control agent 743x to be in the state of still being executed, the status component 7439 of the control agent 743x may transmit an indication to that effect to the control master 347 within the control device 300, and the control master 347 may then relay that indication to the control agent 743y within the node device 700y. Upon receipt of that indication, the start component 7431 of the control agent 743y may then restart the execution of the application routine 747b by the processor component 750 of the node device 700y. Further, in response to the restarting of the application routine 747b, the status component 7439 of the control agent 743y may transmit an indication of the restarting of the application routine 747b to the control master 347 within the control device 300, which may in turn relay that indication to the control agent 743x within the node device 700x. As before, with neither of the application routines 747a or 747d having a dependency on a resource provided by the application routine 747b, this indication may not be acted upon within the node device 700x.

However, as before, the restarting of execution of the application routine 747b may trigger the start component 7431 of the control agent 743y to also restart the application routine 747c due to its dependency on at least one resource provided by the application routine 747b. Also, such restarting of the application routine 747c may trigger the status component 7439 of the control agent 743y to transmit an indication of the restarting of the application routine 747c to the control master 347, which may in turn relay that indication to the control agent 743x within the node device 700x. Due to the dependency of the application routine 747d on at least one resource provided by the application routine 747c, the indication of the application routine 747c having been restarted may trigger the start component 7431 of the control agent 743x to restart the execution of the application routine 747d. Further, such restarting of the application routine 747d may trigger the status component 7439 of the control agent 743x to transmit an indication of the restarting of the application routine 747d to the control master 347, which may in turn relay that indication to the control agent 743y within the node device 700y. However, due to the lack of dependency by either of the application routines 747b or 747c on the application routine 747d, the start component 7431 of the control agent 743y may take no action in response to the indication of the restarting of the application routine 747d.

Returning to FIG. 1, in various embodiments, each of the processor components 350 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked.

In various embodiments, each of the storages 360 and 760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage component, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage components organized into one or more arrays (e.g., multiple ferromagnetic disk drives organized into a Redundant Array of Independent Disks array, or RAID array). It should be noted that although each of these storages is depicted as a single block, one or more of these may include multiple storage components that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 390 and 790 may employ any of a wide variety of communications technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 5:
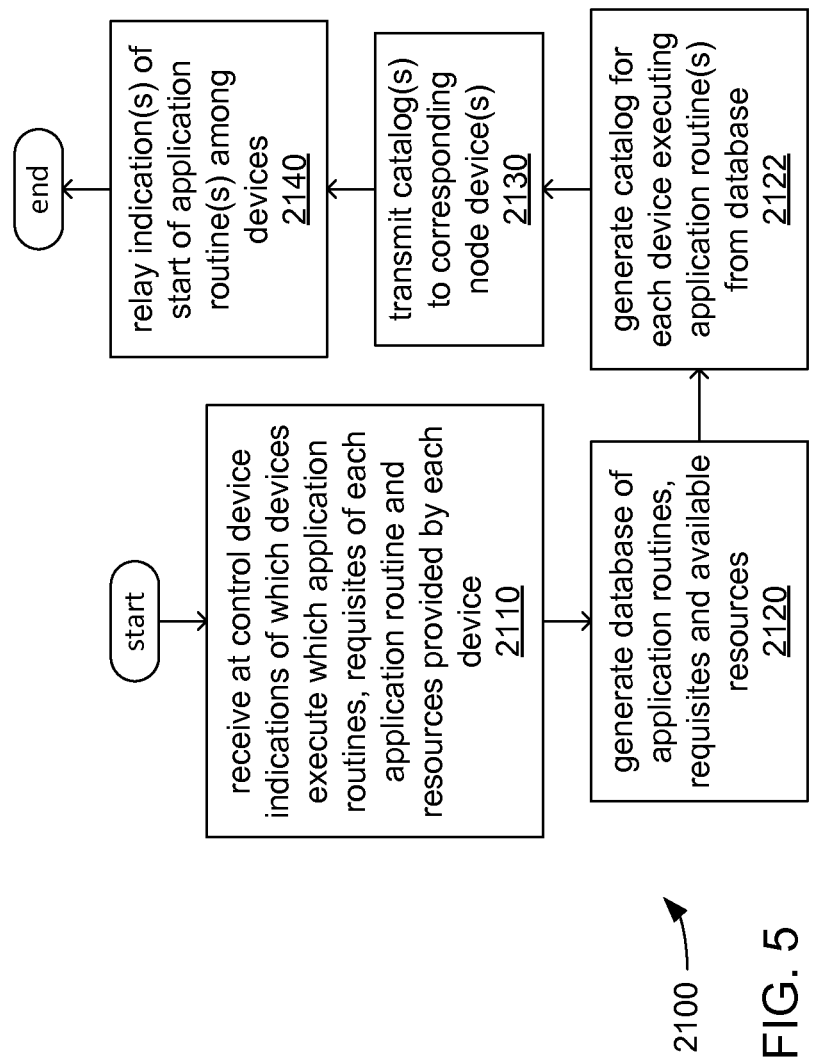
FIG. 5 illustrates an example embodiment of a logic flow of a control device dynamically configuring and starting one or more application routines.

FIG. 5 illustrates an example embodiment of a logic flow 2100. The logic flow 2100 may be representative of some or all of the operations executed by one or more embodiments described herein. More specifically, the logic flow 2100 may illustrate operations performed by the processor component 350 of the control device 300 in executing one or more of the control agent 343, the query component 345 and the control master 347, and/or performed by other component(s) of the control device 300.

At 2110, a processor component of a control device (e.g., the processor component 350 of the control device 300) may receive indications from one or more node devices (e.g., one or more of the node devices 700) of which one(s) of the one or more node devices are to execute various application routines (e.g., one or more of the application routines 747). Along with those indications, the processor component may also receive indications of requisites for the execution of each of those various application routines from the one or more node devices. As has been discussed, among the requisites of an application routine may be a resource required of another application routine such that there may be a dependency by the one application routine on the other application routine. Further, the processor component may additionally receive indications from the one or more node devices of resources provided within each of those one or more node devices. Alternatively or additionally, the processor component may communicate with and receive indications from one or more resource devices (e.g., the one or more resource devices 500) of resources available therefrom.

At 2120, based at least on one or more of the aforementioned received indications, the processor component may generate a database (e.g., the requisites database 334 and/or the configuration database 335) of the application routines to be executed, the requisites of those application routines and/or the resources available from each device to supply those requisites. As has been discussed, such a database may include indications of requisites of one application routine by another such that the database includes indications of dependencies between those application routines.

At 2122, the processor component may generate separate parameter catalogs (e.g., the control parameter catalog 337 and/or one or more instances of the application parameter catalog 737) for at least each device that is to execute an application routine (e.g., the control device 300 and/or one or more of the node devices 700) from the database. As has been discussed, each of those parameter catalogs may include configuration information for the particular one(s) of the application routines to be executed within the particular device for which it is generated, including indications of any dependencies on another application routine. At 2130, the processor component may transmit one or more of those parameter catalogs to the particular node device(s) the one or more parameter catalogs were generated.

Following such generation and transmission of the parameter catalogs, the processor component may receive indications from one or more node devices of the starting of application routines. At 2140, in support of coordinating the start of the application routines in an order that accommodates dependencies that may exist among the application routines, the processor component may relay (retransmit) those indications to other(s) of the one or more node devices.

Figure 6:
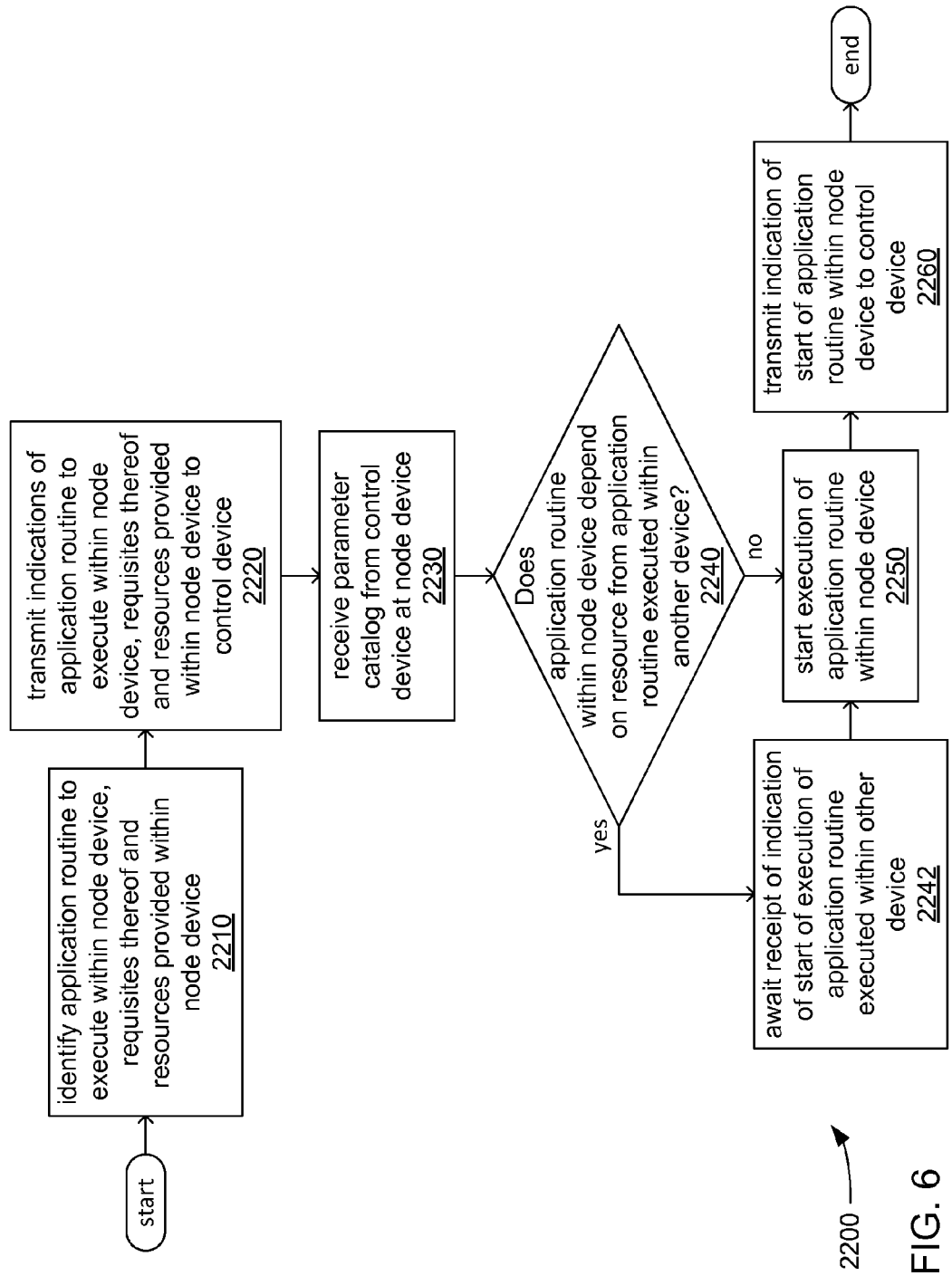
FIG. 6 illustrates an example embodiment of a logic flow of a node device cooperating with a control device to dynamically configure and start an application routine.

FIG. 6 illustrates an example embodiment of a logic flow 2200. The logic flow 2200 may be representative of some or all of the operations executed by one or more embodiments described herein. More specifically, the logic flow 2200 may illustrate operations performed by the processor component 750 of one of the node devices 700 in executing one or more of the control agent 743 and instance(s) of the one or more application routines 747, and/or performed by other component(s) of that one of the node devices 700.

At 2210, a processor component of a node device (e.g., the processor component 750 of one of the one or more node devices 700) may perform various searches within the node device to identify what application routines (e.g., which of one or more application routines 747) are to be executed within the node device, and what are the requisites for each of those application routines. The processor component may also perform various tests to determine the resources provided by the node device for the execution of application routines (e.g., the environment component 741 to provide a VM 770 in an embodiment in which VMs are used).

At 2220, the processor component may transmit indications of what application routines are to be executed within the node device, the requisites of each of those application routines and/or what resources the node device provides to support the execution of application routines to a control master of a control device (e.g., the control master 347 of the control device 300) with which the node device cooperates to execute application routines. Among the indications of requisites provided to the control device may be indications of dependencies by one application routine on a resource provided by another application routine, including in situations where the other application routine may be executed by a different device.

At 2230, a parameter catalog may be received by the processor component of the node device from the control master of the control device. Among the configuration information within the parameter catalog may be indications of dependencies by one application routine on a resource provided by another. As has been discussed, the transmission of parameter catalogs by the control master of the control device to one or more node devices may follow an exchange of indications in which the control device first transmits an indication of the availability of the parameter catalogs to the one or more node devices, then awaits request(s) transmitted by the one or more node devices for their corresponding one(s) of the parameter catalogs before transmitting the parameter catalog(s) to the one or more nodes.

At 2240, the processor component may check whether an application routine to be executed by the processor component within the node device has a dependency on a resource from another application routine executed by another device. If not, then the processor component may commence execution of that application routine at 2250. In so doing, the processor component may retrieve configuration information needed by that application routine from the parameter catalog and provide that configuration information to the application routine. However, if at 2240, the application routine does have a dependency on a resource provided by another application routine executed by another device, then the processor component may await receipt of an indication that execution of that other application routine has been started at 2242, before commencing execution of the application routine at 2250.

At 2260, the processor component may transmit an indication to the control device of the start of execution of the application routine within the node device. As has been discussed, the control device may relay such indications of the start of execution of application routines transmitted by one node device to one or more other node devices.

Figure 7:
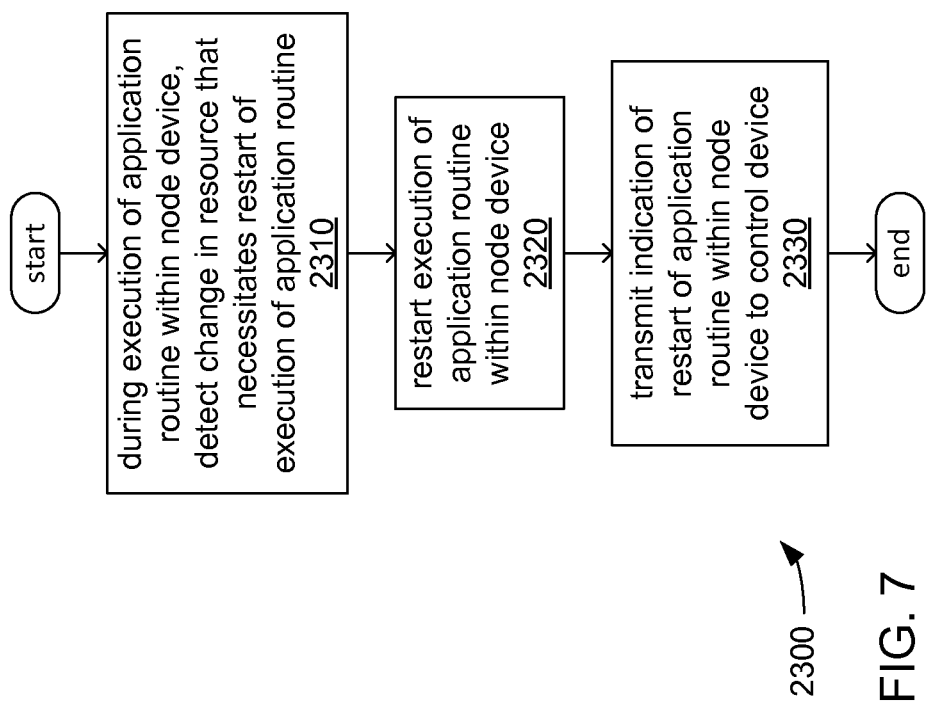
FIG. 7 illustrates an example embodiment of a logic flow of a node device restarting an application routine.

FIG. 7 illustrates an example embodiment of a logic flow 2300. The logic flow 2300 may be representative of some or all of the operations executed by one or more embodiments described herein. More specifically, the logic flow 2300 may illustrate operations performed by the processor component 750 of one of the node devices 700 in executing one or more of the control agent 743 and instance(s) of the one or more application routines 747, and/or performed by other component(s) of that one of the node devices 700.

At 2310, a processor component of a node device (e.g., the processor component 750 of one of the one or more node devices 700) may, during its execution of an application routine (e.g., one of the application routines 747), detect that there has been a change in a resource on which the application routine depends that necessitates a restarting of execution of the application routine. As has been discussed, such a resource may be any of a variety of pieces of information, services, etc. that may be provided by another application routine, a VM environment and/or by another device (e.g., one or more of the resource devices 500).

At 2320, the processor component may restart execution of the application routine within the node device. At 2330, the processor component may transmit an indication to a control master of a control device (e.g., the control master 347 of the control device 300) that execution of the application routine has been restarted. As has been discussed, such indications of the start, restart or of continuing execution of application routines transmitted by one node device may be relayed by the control device to one or more other node devices.

Figure 8:
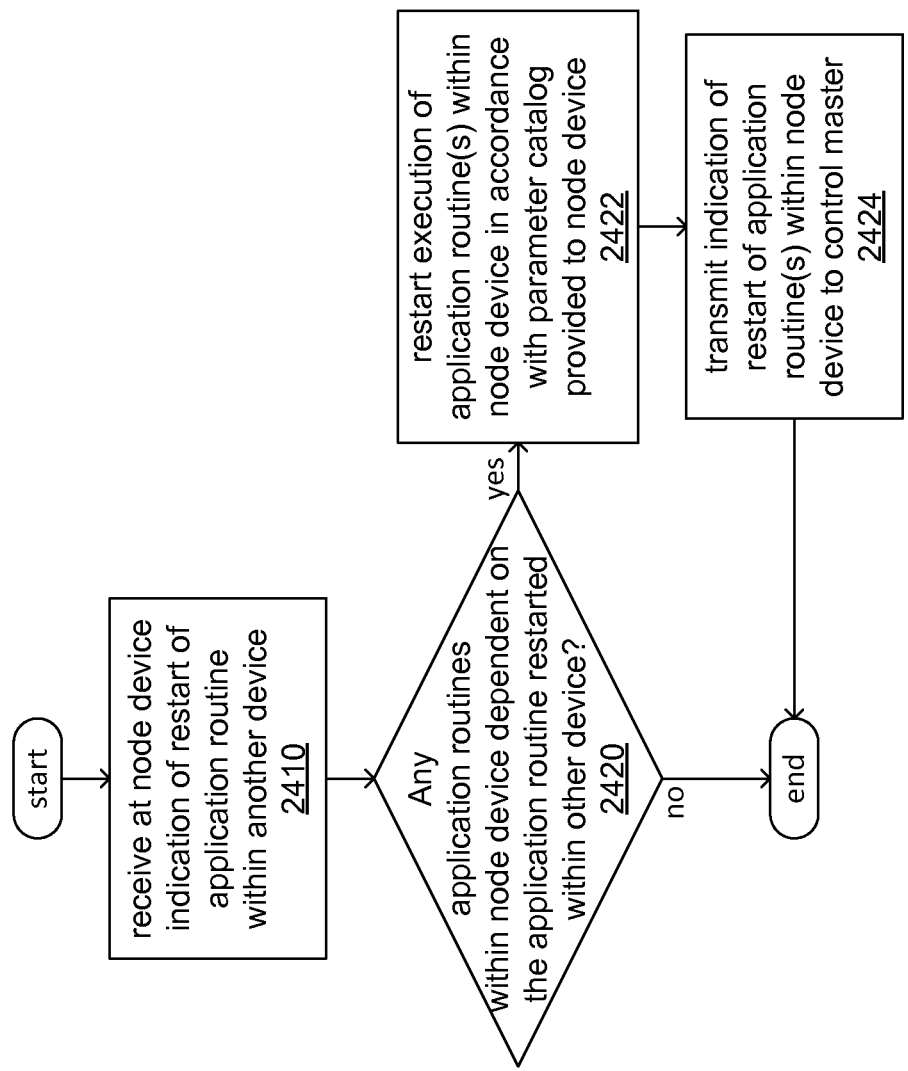
FIG. 8 illustrates an example embodiment of another logic flow of a node device restarting an application routine.

FIG. 8 illustrates an example embodiment of a logic flow 2400. The logic flow 2400 may be representative of some or all of the operations executed by one or more embodiments described herein. More specifically, the logic flow 2400 may illustrate operations performed by the processor component 750 of one of the node devices 700 in executing one or more of the control agent 743 and instance(s) of the one or more application routines 747, and/or performed by other component(s) of that one of the node devices 700.

At 2410, a processor component of a node device (e.g., the processor component 750 of one of the one or more node devices 700) may receive an indication of an application routine executed by another device having been restarted. At 2420, in response to the trigger, the processor component may check whether any application routines executed within the node device has a dependency on a resource from that application routine for which execution has been restarted on that other device. If not, then the processor component may take no further action in response to the received indication of the restarting of that application routine within that other device.

However, if at 2422, there is an application routine executed within the node device that does have a dependency on a resource provided by that application routine that has been restarted within that other device, then the processor component may restart the execution of the application within the node device that has that dependency at 2422. At 2424, the processor component may transmit an indication to the control device of the restart of execution of the application routine within the node device that has that dependency.

Figure 9:
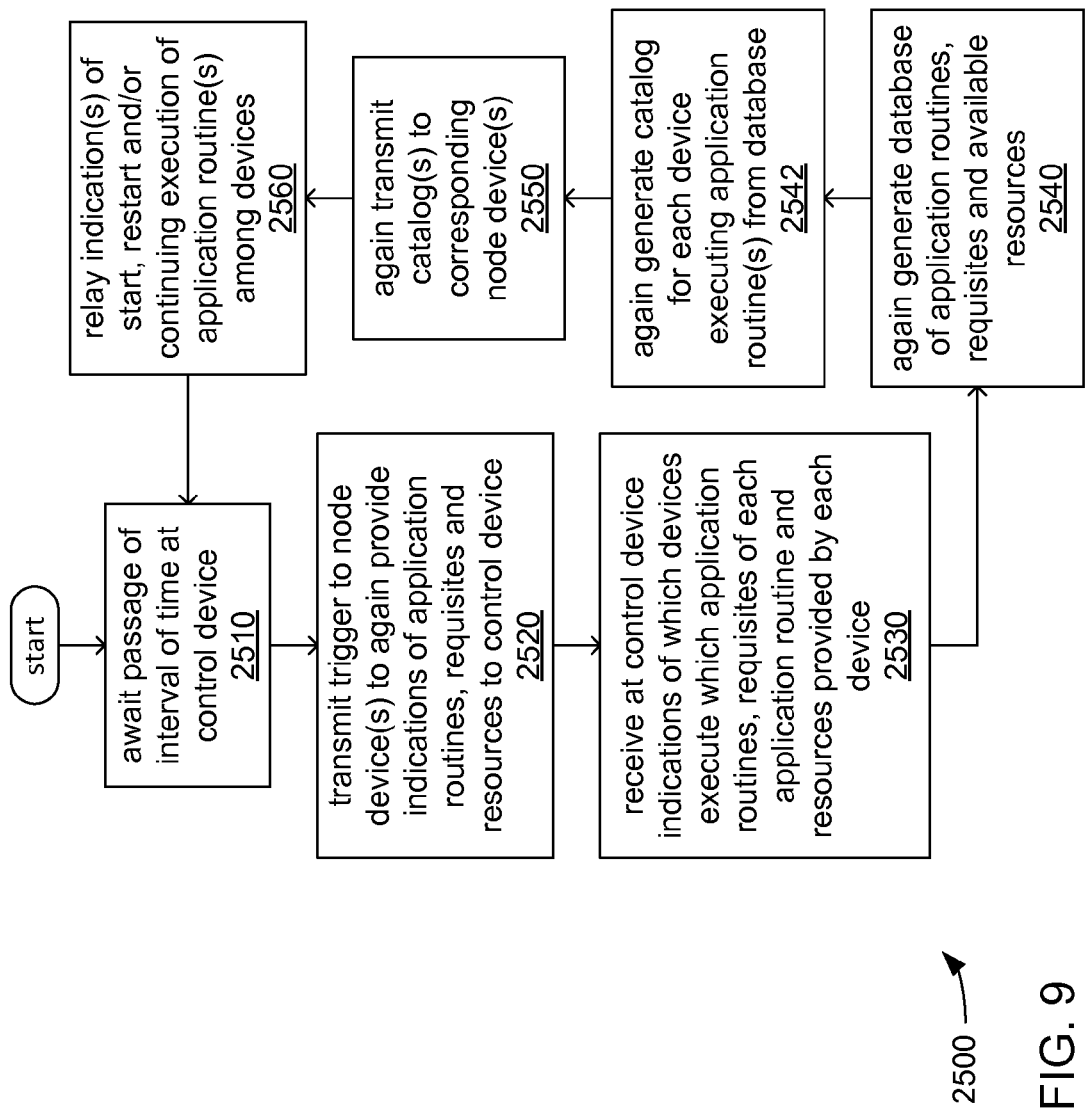
FIG. 9 illustrates an example embodiment of a logic flow of a control device repeating dynamic configuration of one or more application routines.

FIG. 9 illustrates an example embodiment of a logic flow 2500. The logic flow 2100 may be representative of some or all of the operations executed by one or more embodiments described herein. More specifically, the logic flow 2500 may illustrate operations performed by the processor component 350 of the control device 300 in executing one or more of the control agent 343, the query component 345 and the control master 347, and/or performed by other component(s) of the control device 300.

At 2510, a processor component of a control device (e.g., the processor component 350 of the control device 300) may await the passage of a predetermined interval of time. As has been discussed, the discovery of configuration information and the generation of databases and catalogs of configuration information may be repeated on a recurring basis, and that recurring basis may be repetition at a recurring interval of time.

At 2520, following passage of that interval of time, the processor component may transmit a command, a request or other form of trigger to one or more node devices (e.g., one or more of the node devices 700) to once again provide the control device with indications of which one(s) of the one or more node devices are to execute various application routines (e.g., one or more of the application routines 747). Along with those indications, the one or more node devices may also be triggered to provide indications of requisites for the execution of each of those various application routines. Again, among the requisites of an application routine may be a resource required of another application routine such that there may be a dependency by the one application routine on the other application routine. Further, the one or more node devices may be triggered to provide indications of resources provided within each of those one or more node devices. At 2530, the processor component may receive such indications from the one or more node devices.

At 2540, based at least on one or more of the aforementioned received indications, the processor component may again generate a database (e.g., the requisites database 334 and/or the configuration database 335) of the application routines to be executed, the requisites of those application routines and/or the resources available from each device to supply those requisites. Again, such a database may include indications of requisites of one application routine by another such that the database includes indications of dependencies between those application routines.

At 2542, the processor component may again generate separate parameter catalogs (e.g., the control parameter catalog 337 and/or one or more instances of the application parameter catalog 737) for at least each device that is to execute an application routine (e.g., the control device 300 and/or one or more of the node devices 700) from the database. Again, each of those parameter catalogs may include configuration information for the particular one(s) of the application routines to be executed within the particular device for which it is generated, including indications of any dependencies on another application routine. At 2550, the processor component may transmit one or more of those re-generated parameter catalogs to the particular node device(s) the one or more parameter catalogs were generated.

Following such re-generation and re-transmission of the parameter catalogs, the processor component may receive indications from one or more node devices of the starting, restarting and/or continued execution of application routines. As has been discussed, these indications may reflect the results of checks made by control agents (e.g., instances of the control agent 743) of the status of execution of application routines, including whether an application routine is still successfully being executed or needed to be restarted. At 2560, in support of coordinating the start and/or restart of the application routines in an order that accommodates dependencies that may exist among the application routines, the processor component may relay (retransmit) those indications to other(s) of the one or more node devices.

Figure 10:
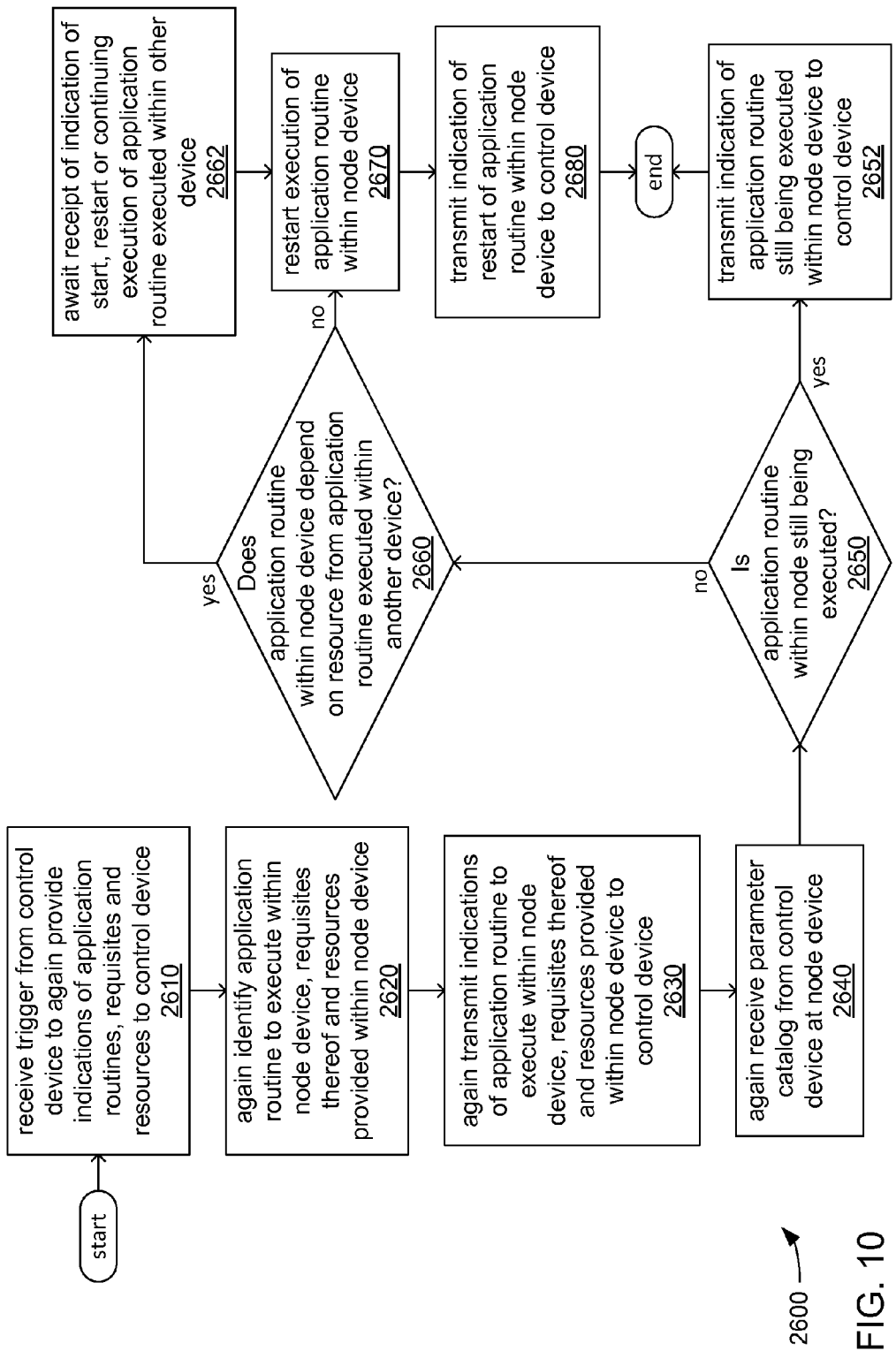
FIG. 10 illustrates an example embodiment of a logic flow of a node device cooperating with a control device to dynamically restart an application routine.

FIG. 10 illustrates an example embodiment of a logic flow 2600. The logic flow 2600 may be representative of some or all of the operations executed by one or more embodiments described herein. More specifically, the logic flow 2600 may illustrate operations performed by the processor component 750 of one of the node devices 700 in executing one or more of the control agent 743 and instance(s) of the one or more application routines 747, and/or performed by other component(s) of that one of the node devices 700.

At 2610, a processor component of a node device (e.g., the processor component 750 of one of the one or more node devices 700) may receive a command, a request or other form of trigger from a control device (e.g., the control device 300) to again provide the control device with indications of what application routines (e.g., one or more of the application routines 747) are to be executed within the node device, what are the requisites for the execution of each of those various application routines, and what resources are provided within the node device to support the execution of application routines. Again, among the requisites of an application routine may be a resource required of another application routine such that there may be a dependency by the one application routine on the other application routine.

At 2620, in response to the trigger, the processor component of a node device may again perform various searches within the node device to identify what application routines are to be executed within the node device, and the requisites for each of those application routines. The processor component may also again perform various tests to identify the resources provided by the node device for the execution of application routines (e.g., the environment component 741 to provide a VM 770).

At 2630, the processor component may again transmit indications of what application routines are to be executed within the node device, the requisites of each of those application routines and/or what resources the node device provides to support the execution of application routines to the control device. Among the indications of requisites provided to the control device may be indications of dependencies by one application routine on a resource provided by another application routine, including in situations where the other application routine may be executed by a different device.

At 2640, a parameter catalog may again be received by the processor component of the node device from the control master of the control device. Among the configuration information within the parameter catalog may be indications of dependencies by one application routine on a resource provided by another. Again, the transmission of parameter catalogs by the control master of the control device to one or more node devices may follow an exchange of indications in which the control device first transmits an indication of the availability of the parameter catalogs to the one or more node devices, then awaits request(s) transmitted by the one or more node devices for their corresponding one(s) of the parameter catalogs before transmitting the parameter catalog(s) to the one or more nodes.

At 2650, in response to receiving the parameter catalog, the processor component may check whether an application routine for which execution was earlier started is still being executed. If so, then the processor component may transmit an indication to the control device of the application routine still being executed.

However, if at 2650, the application routine is not still being executed (or has otherwise become nonfunctional, such as becoming unresponsive), then at 2660, the processor component may check whether the application routine has a dependency on a resource from another application routine executed by another device. If not, then the processor component may restart execution of that application routine at 2670. However, if at 2660, the application routine does have a dependency on a resource provided by another application routine executed by another device, then the processor component may await receipt of an indication that execution of that other application routine has been started, restarted or is continuing at 2662, before restarting execution of the application routine at 2670.

At 2680, the processor component may transmit an indication to the control device of the restart of execution of the application routine within the node device. Again, such indications of the start, restart or of continuing execution of application routines transmitted by one node device may be relayed by the control device to one or more other node devices.

Figure 11:
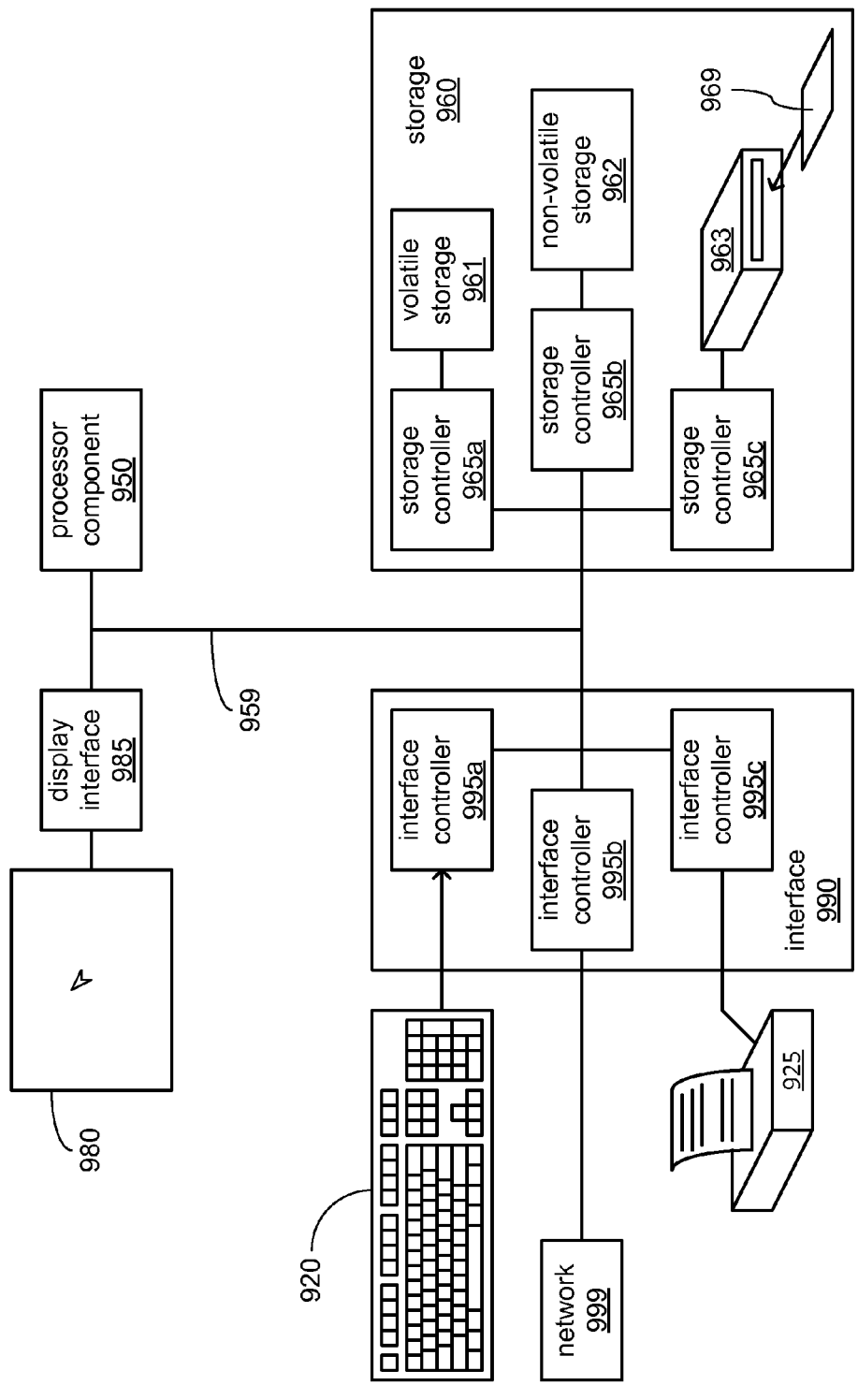
FIG. 11 illustrates an example embodiment of a processing architecture.

FIG. 11 illustrates an example embodiment of a processing architecture 3000 suitable for implementing various embodiments as previously described. More specifically, the processing architecture 3000 (or variants thereof) may be implemented as part of one or more of the computing devices 300 or 700. It should be noted that components of the processing architecture 3000 are given reference numbers in which the last two digits correspond to the last two digits of reference numbers of at least some of the components earlier depicted and described as part of the computing devices 300 and 700. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage component (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information over the communications media. The information can be implemented as transmissions allocated to one or more electrical and/or optical conductors. A message (including a command, status, address or data message) may be one of such transmissions or may be a plurality of such transmissions, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a touch screen 980 incorporating a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which commands and/or data are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350 and 750) may include any of a wide variety of commercially available processors, employing any of a wide variety of technologies and implemented with one or more cores physically combined in any of a number of ways.

As previously discussed, the storage 960 (corresponding to the storages 360 and 560) may be made up of one or more distinct storage components based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage component in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage components employing different technologies, it is also commonplace for such different storage components to be coupled to other portions of a computing device through different storage controllers coupled to their differing storage components through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969. The machine-readable storage medium 969, with executable instructions stored thereon, may be an example embodiment of a computer-program product that may or may not be fabricated in large quantities to enable distribution of those executable instructions.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage components to store information, such as sequences of instructions, in a manner akin to a compact flash card. Again, it is commonplace to employ differing types of storage components in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the network interfaces 390 or 790) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless timings and/or protocols to access other computing devices through the depicted network 999 (perhaps a network made up of one or more links, smaller networks, or perhaps the Internet). The interface controller 995c may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 780), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the touch screen 980 may make use of timings and/or protocols that conform to any of a variety of industry standards, including without limitation, any of a variety of analog video interfaces, Digital Video Interface (DVI), DisplayPort, etc.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server, which can deliver statistical modeling and machine learning capabilities in a highly interactive programming environment that enables multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-program product tangibly embodied in a non-transitory machine-readable storage medium, the computer-program product including instructions operable to cause a processor component to perform operations including:
   identify a first application routine stored within a storage of a first node device for execution by the first node device;
   identify execution of a remote application routine by a second node device as a first requisite for execution of the first application routine from a first application requisites data stored within the storage;
   provide indications of storage of the first application routine within the first node device for execution by the first node device and the first requisite to a control master;
   restart an earlier started execution of the first application routine by the first node in response at least to receipt of an indication that execution of the remote application routine by the second node device has been restarted in accordance with a catalog received from the control master, wherein the catalog comprises indications of the first and remote application routines and an indication of the first requisite based on the indications provided to the control master; and
   provide an indication to the control master of the restart of execution of the first application routine.

2. The computer-program product of claim 1, the processor component caused to perform operations including:
   detect a change in a resource provided by the first node to support execution of the first application routine during execution of the first application routine; and
   restart execution of the first application routine in accordance with the catalog in response to the change in the resource.

3. The computer-program product of claim 2, the change in the resource comprising at least one of a change in a file name, a change in location of data, a change in a location of a device, a change in identity of an operator of a device or a change in a security credential.

4. The computer-program product of claim 1, the processor component caused to perform operations including:
   detect a change in a resource provided by a resource device via a network coupling the resource device to the first node to support execution of the first application routine during execution of the first application routine; and
   restart execution of the first application routine in accordance with the catalog in response to the change in the resource.

5. The computer-program product of claim 4, the change in the resource comprising at least one of a change in a network address of the resource device, a change in a protocol to communicate with the resource device or a change in a security credential to access the resource device.

6. The computer-program product of claim 1, the processor component caused to perform operations including:
   identify a second application routine as stored within the storage for execution by the first node device;
   identify execution of the first application routine as a requisite for execution of the second application routine from a second requisites data stored within the storage;
   provide indications of storage of the second application routine within the first node device for execution by the first node device and of execution of the first application as a requisite for execution of the second application to the control master;
   restart execution of the second application routine in response to the restart of execution of the first application routine in accordance with the catalog, wherein the catalog comprises an indication of the second application routine and an indication that execution of the first application routine is a requisite for execution of the second application routine; and
   provide an indication to the control master of the restart of execution of the second application routine.

7. The computer-program product of claim 1, the processor component caused to perform operations including:
   prior to the restart of execution of the first application routine, start execution of the first application routine in response to receipt of an indication that execution of the remote application routine by the second node device has started in accordance with the catalog; and
   provide an indication to the control master of the start of execution of the first application routine.

8. The computer-program product of claim 7, the processor component caused to perform operations including:
   prior to the start of execution of the first application routine, receive indications of storage of the remote application routine within the second node for execution by the second node and another requisite of the remote application routine from the second node device;

derive the catalog and another catalog from the indications of storage of the first and remote applications and indications of the first and other requisites, wherein:

the catalog comprises an indication of the first application routine as executed locally and the remote application routine as executed remotely; and the other catalog comprises an indication of the remote application routine as executed locally and the first application routine as executed remotely; and transmit the other catalog to the second node device via a network to enable start of execution of the remote application routine by the second node.

9. The computer-program product of claim 8, the processor component caused to perform operations including:

transmit a request to the second node device for new indications of application routines to be executed by the second node device and of requisites for execution of application routines by the second node device;

again receive indications of the storage of the remote application routine and the other requisite of the remote application routine from the second node device;

again derive the catalog and the other catalog from the again received indications of the storage of the first and remote applications and indications of the first and other requisites;

again transmit the other catalog to the second node device via the network;

check a status of execution of the first application routine in accordance with the catalog following repetition of the derivation of the catalog;

in response to a determination that the first application routine continues to be executed, provide an indication to the control master of the continuing execution of the first application routine; and in response to a determination that the first application routine has ceased to be executed:

restart execution of the first application routine in response to receipt of an indication that execution of the remote application routine is continuing or has been restarted in accordance with the catalog; and provide an indication to the control master of the restart of execution of the first application routine.

10. The computer-program product of claim 1, the processor component caused to perform operations including:

receive a request from the control master for new indications of application routines to be executed by the first node device and of requisites for execution of application routines by the first node device;

in response to the request:

again identify the first application routine as stored within the storage of the first node device for execution by the first node device;

again identify execution of the remote application routine by the second node device as the first requisite for execution of the first application routine from the first application requisites data stored within the storage;

again provide indications of storage of the first application routine within the first node device for execution by the first node device and the first requisite to a control master; and check a status of execution of the first application routine in accordance with the catalog following receipt of the catalog again from the control master;

in response to a determination that the first application routine continues to be executed, provide an indication to the control master of the continuing execution of the first application routine; and in response to a determination that the first application routine has ceased to be executed;

restart execution of the first application routine in response to receipt of an indication that execution of the remote application routine is continuing or has been restarted in accordance with the catalog; and provide an indication to the control master of the restart of execution of the first application routine.

11. A computer-implemented method comprising:

identifying a first application routine stored within a storage of a first node device for execution by a first processor component of the first node device;

identifying execution of a remote application routine by a second processor component of a second node device as a first requisite for execution of the first application routine from a first application requisites data stored within the storage;

providing indications of storage of the first application routine within the first node device for execution by the first processor component and the first requisite to a control master;

restarting an earlier started execution of the first application routine by the first processor component in response to receipt of an indication that execution of the remote application routine by the second processor component of the second node device has been restarted in accordance with a catalog received from the control master, wherein the catalog comprises indications of the first and remote application routines and an indication of the first requisite based on the indications provided to the control master; and providing an indication to the control master of the start of execution of the first application routine.

12. The computer-implemented method of claim 11, comprising:

detecting a change in a resource provided by the first node to support execution of the first application routine during execution of the first application routine; and restarting execution of the first application routine in accordance with the catalog in response to the change in the resource.

13. The computer-implemented method of claim 12, the change in the resource comprising at least one of a change in a file name, a change in location of data, a change in a location of a device, a change in identity of an operator of a device or a change in a security credential.

14. The computer-implemented method of claim 11, comprising:

detecting a change in a resource provided by a resource device via a network coupling the resource device to the first node to support execution of the first application routine during execution of the first application routine; and restarting execution of the first application routine in accordance with the catalog in response to the change in the resource.

15. The computer-implemented method of claim 14, the change in the resource comprising at least one of a change in a network address of the resource device, a change in a protocol to communicate with the resource device or a change in a security credential to access the resource device.

16. The computer-implemented method of claim 11, comprising:

identifying a second application routine as stored within the storage for execution by the first processor component;

identifying execution of the first application routine as a requisite for execution of the second application routine from a second requisites data stored within the storage;

providing indications of storage of the second application routine within the first node device for execution by the first processor component and of execution of the first application as a requisite for execution of the second application to the control master;

restarting execution of the second application routine in response to the restart of execution of the first application routine in accordance with the catalog, wherein the catalog comprises an indication of the second application routine and an indication that execution of the first application routine is a requisite for execution of the second application routine; and providing an indication to the control master of the restart of execution of the second application routine.

17. The computer-implemented method of claim 11, comprising:

prior to the restart of execution of the first application routine, starting execution of the first application routine in response to receipt of an indication that execution of the remote application routine by the second processor component has started in accordance with the catalog; and providing an indication to the control master of the start of execution of the first application routine.

18. The computer-implemented method of claim 17, comprising:

prior to the start of execution of the first application routine, receiving indications of storage of the remote application routine and another requisite of the remote application routine from the second node device;

deriving the catalog and another catalog from the indications of storage the first and remote applications and indications of the first and other requisites, wherein:

the catalog comprises an indication of the first application routine as executed locally and the remote application routine as executed remotely; and the other catalog comprises an indication of the remote application routine as executed locally and the first application routine as executed remotely; and transmitting the other catalog to the second node device via a network to enable start of execution of the remote application routine by the second processor component.

19. The computer-implemented method of claim 18, comprising:

transmitting a request to the second node device for new indications of application routines to be executed by the second processor component and of requisites for execution of application routines by the second processor component;

again receiving indications of the storage of the remote application routine and the other requisite of the remote application routine from the second node device;

again deriving the catalog and the other catalog from the again received indications of the storage of the first and remote applications and indications of the first and other requisites;

again transmitting the other catalog to the second node device via the network;

checking a status of execution of the first application routine in accordance with the catalog following repetition of the derivation of the catalog;

in response to a determination that the first application routine continues to be executed, providing an indication to the control master of the continuing execution of the first application routine; and in response to a determination that the first application routine has ceased to be executed:

restarting execution of the first application routine in response to receipt of an indication that execution of the remote application routine is continuing or has been restarted in accordance with the catalog; and providing an indication to the control master of the restart of execution of the first application routine.

20. The computer-implemented method of claim 11, comprising:

receiving a request from the control master for new indications of application routines to be executed by the first processor component and of requisites for execution of application routines by the first processor component;

in response to the request:

again identifying the first application routine as stored within the storage of the first node device for execution by the first processor component;

again identifying execution of the remote application routine by the second processor component as the first requisite for execution of the first application routine from the first application requisites data stored within the storage;

again providing indications of storage of the first application routine within the first node device for execution by the first processor component and the first requisite to a control master; and checking a status of execution of the first application routine in accordance with the catalog following receipt of the catalog again from the control master;

in response to a determination that the first application routine continues to be executed, providing an indication to the control master of the continuing execution of the first application routine; and in response to a determination that the first application routine has ceased to be executed:

restarting execution of the first application routine in response to receipt of an indication that execution of the remote application routine is continuing or has been restarted in accordance with the catalog; and providing an indication to the control master of the restart of execution of the first application routine.

21. An apparatus comprising:

a processor component;

a storage to store a first application routine for execution by the processor component and a first application requisites data;

a discovery component for execution by the processor component to identify the first application routine as stored within the storage for execution by the processor component, to identify execution of a remote application routine by another processor component of a node device as a first requisite for execution of the first application routine from the first application requisites data, and to provide indications of storage of the first application routine within the storage for execution by the processor component and the first requisite to a control master;

a start component for execution by the processor component to restart an earlier started execution of the first application routine in response to receipt of an indication that execution of the remote application routine by the other processor component of the node device has been restarted in accordance with a catalog received from the control master, wherein the catalog comprises indications of the first and remote application routines and an indication of the first requisite based on the indications provided to the control master; and a status component for execution by the processor component to provide an indication to the control master of the restart of execution of the first application routine.

22. The apparatus of claim 21, comprising a resource indicated in the first application requisites data as a second requisite of the first application routine, wherein:
the first application routine is to detect a change in the resource during execution of the first application routine; and
the start component is to restart execution of the first application routine in accordance with the catalog in response to the change in the resource.

23. The apparatus of claim 22, the change in the resource comprising at least one of a change in a file name, a change in location of data, a change in a location of a device, a change in identity of an operator of a device or a change in a security credential.

24. The apparatus of claim 21, wherein:
the first application routine is to detect a change in a resource provided by a resource device via a network coupling the resource device to the first node to support execution of the first application routine during execution of the first application routine; and
the start component is to restart execution of the first application routine in accordance with the catalog in response to the change in the resource.

25. The apparatus of claim 24, the change in the resource comprising at least one of a change in a network address of the resource device, a change in a protocol to communicate with the resource device or a change in a security credential to access the resource device.

26. The apparatus of claim 21, wherein:
the storage is to store a second application routine for execution by the processor component and a second requisites data;
the discovery component is to:
identify the second application routine as stored within the storage for execution by the processor component;
identify execution of the first application routine as a requisite for execution of the second application routine from the second requisites data; and
provide indications of storage of the second application routine within the first node device for execution by the processor component and of execution of the first application as a requisite for execution of the second application to the control master;
the start component is to restart execution of the second application routine in response to the restart of execution of the first application routine in accordance with the catalog, wherein the catalog comprises an indication of the second application routine and an indication that execution of the first application routine is a requisite for execution of the second application routine; and
the status component is to provide an indication to the control master of the restart of execution of the second application routine.

27. The apparatus of claim 21, wherein:
prior to the restart of execution of the first application routine, the start component is to start execution of the first application routine in response to receipt of an indication that execution of the remote application routine by the other processor component has started in accordance with the catalog; and
the status component is to provide an indication to the control master of the start of execution of the first application routine.

28. The apparatus of claim 27, comprising the control master, wherein:
prior to the start of execution of the first application routine, the control master is to receive indications of storage of the remote application routine and another requisite of the remote application routine from the node device;
the control master is to derive the catalog and another catalog from the indications of storage of the first and remote applications and indications of the first and other requisites;
the catalog comprises an indication of the first application routine as executed locally and the remote application routine as executed remotely;
the other catalog comprises an indication of the remote application routine as executed locally and the first application routine as executed remotely; and
the control master is to transmit the other catalog to the node device via a network to enable start of execution of the remote application routine by the other processor component.

29. The apparatus of claim 28, wherein:
the control master is to transmit a request to the node device for new indications of application routines to be executed by the other processor component and of requisites for execution of application routines by the other processor component;
the control master is to again receive indications of the storage of the remote application routine and the other requisite of the remote application routine from the node device;
the control master is to again derive the catalog and the other catalog from the again received indications of the storage of the first and remote applications and indications of the first and other requisites;
the control master is to again transmit the other catalog to the node device via the network;
the status component is to checking a status of execution of the first application routine in accordance with the catalog following repetition of the derivation of the catalog;
in response to a determination that the first application routine continues to be executed, the status component is to provide an indication to the control master of the continuing execution of the first application routine; and
in response to a determination that the first application routine has ceased to be executed:
the start component is to restart execution of the first application routine in response to receipt of an indication that execution of the remote application routine is continuing or has been restarted in accordance with the catalog; and
the status component is to provide an indication to the control master of the restart of execution of the first application routine.

30. The apparatus of claim 21, comprising the control master, wherein:
the discovery component is to receive a request from the control master for new indications of application routines to be executed by the processor component and of requisites for execution of application routines by the processor component;

in response to the request:
  the discovery component is to again identify the first application routine as stored within the storage for execution by the processor component;
  the discovery component is to again identify execution of the remote application routine by the other processor component as the first requisite for execution of the first application routine from the first application requisites data stored within the storage;
  the discovery component is to again provide indications of storage of the first application routine within the storage for execution by the processor component and the first requisite to a control master; and
  the status component is to check a status of execution of the first application routine in accordance with the catalog following receipt of the catalog again from the control master;

in response to a determination that the first application routine continues to be executed, the status component is to provide an indication to the control master of the continuing execution of the first application routine; and in response to a determination that the first application routine has ceased to be executed:
  the start component is to restart execution of the first application routine in response to receipt of an indication that execution of the remote application routine is continuing or has been restarted in accordance with the catalog; and
  the status component is to provide an indication to the control master of the restart of execution of the first application routine.

31. The apparatus of claim 21, comprising a network interface to receive indications of the restart of execution of the remote application routine from the control master via a network, and to transmit the indication of restart of execution of the first application routine to the control master via the network.

* * * * *